(12) United States Patent
Taylor

(10) Patent No.: US 11,754,383 B2
(45) Date of Patent: Sep. 12, 2023

(54) GENERATING EFFICIENT MEASUREMENT PROTOCOL USING SEGMENT GROUPING AND LIMITING TIME-DEPENDENT MEASUREMENT DEVIATIONS

(71) Applicant: Hexagon Metrology, Inc., North Kingstown, RI (US)

(72) Inventor: Sean Taylor, North Kingstown, RI (US)

(73) Assignee: Hexagon Metrology, Inc., North Kingstown, RI (US)

(*) Notice: Subject to any disclaimer, the term of this patent is extended or adjusted under 35 U.S.C. 154(b) by 0 days.

(21) Appl. No.: 17/824,852

(22) Filed: May 25, 2022

(65) Prior Publication Data

US 2022/0381546 A1 Dec. 1, 2022

Related U.S. Application Data

(60) Provisional application No. 63/192,725, filed on May 25, 2021, provisional application No. 63/192,995, (Continued)

(51) Int. Cl.
*G01B 5/008* (2006.01)
*G01B 11/00* (2006.01)
*G01B 21/04* (2006.01)

(52) U.S. Cl.
CPC ............ *G01B 5/008* (2013.01); *G01B 11/005* (2013.01); *G01B 21/045* (2013.01); *G01B 21/047* (2013.01)

(58) Field of Classification Search
CPC .............................. G01B 5/008; G01B 21/045
(Continued)

(56) References Cited

U.S. PATENT DOCUMENTS 5,611,147 A * 3/1997 Raab .................... G05B 19/401
33/503
5,822,877 A 10/1998 Dai
(Continued)

FOREIGN PATENT DOCUMENTS

CN 107702651 A 2/2018
CN 112446123 A 3/2021

OTHER PUBLICATIONS

International Search Report and Written Opinion for International Application No. PCT/US2022/030971 dated Sep. 9, 2022, 14 pages.
(Continued)

*Primary Examiner* — George B Bennett
(74) *Attorney, Agent, or Firm* — Nutter McClennen & Fish LLP

(57) ABSTRACT

A method efficiently measures an object having a feature. The feature has a plurality of profiles each having a surface. The method provides a coordinate measuring machine having a wrist coupled with a measuring probe. The probe has a tolerance angle with respect to a surface normal of a surface to be measured. The wrist has a first given orientation that is adjustable to a second given orientation. The method segments an object to be measured into a plurality of segments as a function of an ideal vector that can be used to measure a given segment within the tolerance. A first group of segments that can be measured within the probe tolerance for a first ideal vector is determined. A second group of segments that can be measured within the probe tolerance for a second ideal vector is determined.

20 Claims, 20 Drawing Sheets

Related U.S. Application Data filed on May 25, 2021, provisional application No. 63/192,761, filed on May 25, 2021, provisional application No. 63/192,909, filed on May 25, 2021.

(58) Field of Classification Search
USPC .......................................................... 33/503
See application file for complete search history.

(56) References Cited

U.S. PATENT DOCUMENTS

| | | | | |
|---|---|---|---|---|
| 6,701,267 | B2* | 3/2004 | Noda | G01B 21/047 33/503 |
| 7,370,430 | B2* | 5/2008 | Chang | G01B 21/047 33/503 |
| 7,809,523 | B2* | 10/2010 | Hunter | G01B 21/04 33/503 |
| 9,207,076 | B2* | 12/2015 | Chang | G01B 21/045 |
| 10,036,627 | B2* | 7/2018 | Ferrari | G01B 21/04 |
| 10,907,949 | B2* | 2/2021 | Singh | G01B 5/012 |
| 10,969,760 | B2* | 4/2021 | Lankalapalli | G01B 21/047 |
| 11,045,944 | B2* | 6/2021 | Phipps | G01B 21/045 |
| 11,454,492 | B2* | 9/2022 | Raab | F16M 11/2014 |
| 11,619,478 | B2* | 4/2023 | Cousin | G01B 21/047 33/503 |
| 2005/0171733 | A1 | 8/2005 | Hough | |
| 2013/0030773 | A1 | 1/2013 | O'Hare | |
| 2022/0143812 | A1* | 5/2022 | Creachbaum | B25J 19/022 |

OTHER PUBLICATIONS

International Search Report and Written Opinion for International Application No. PCT/US2022/030973 dated Sep. 15, 2022, 14 pages.

International Search Report and Written Opinion for International Application No. PCT/US2022/030974 dated Sep. 26, 2022, 15 pages.

International Search Report and Written Opinion for International Application No. PCT/US2022/030976 dated Aug. 12, 2022, 16 pages.

* cited by examiner

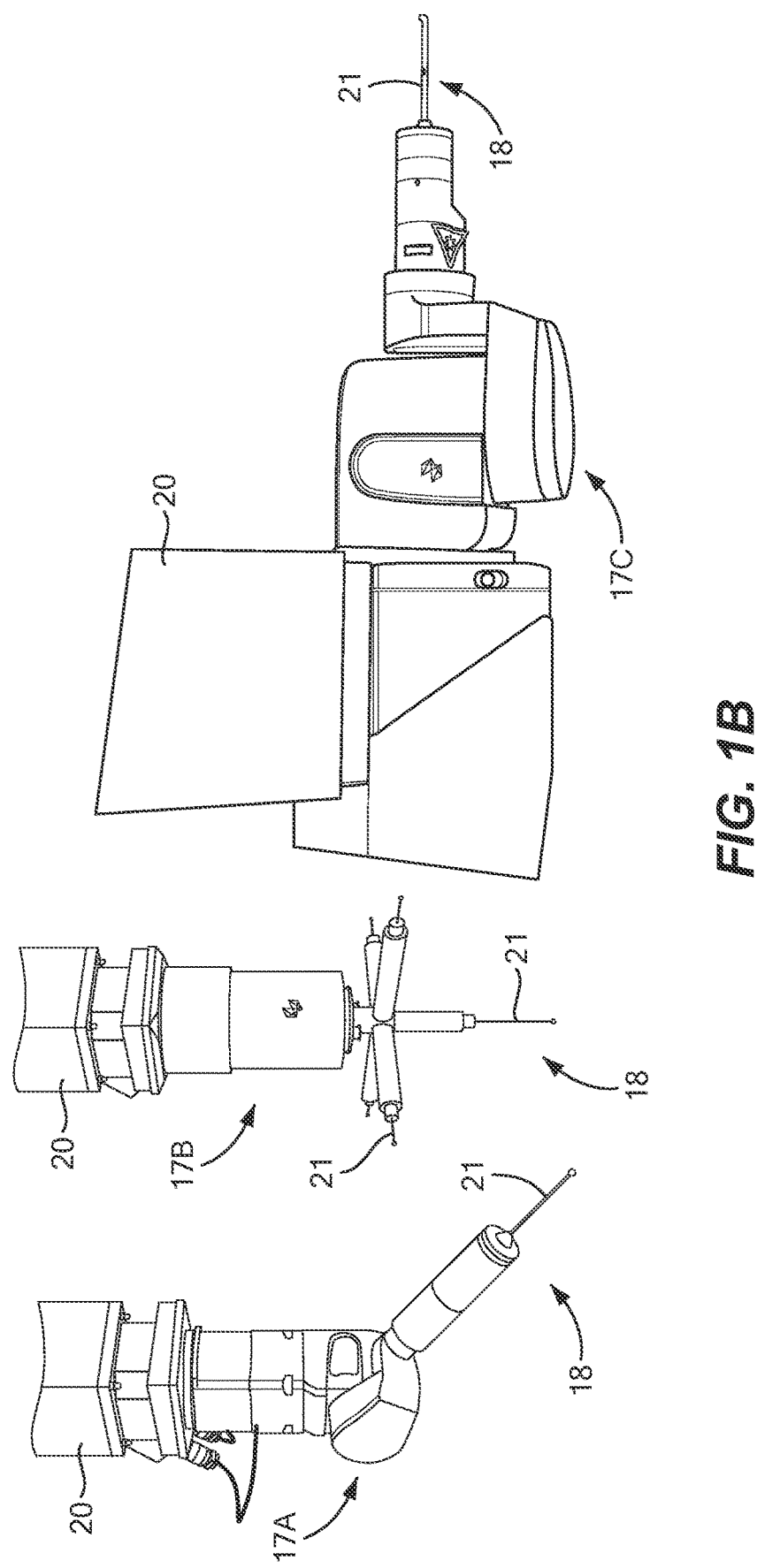

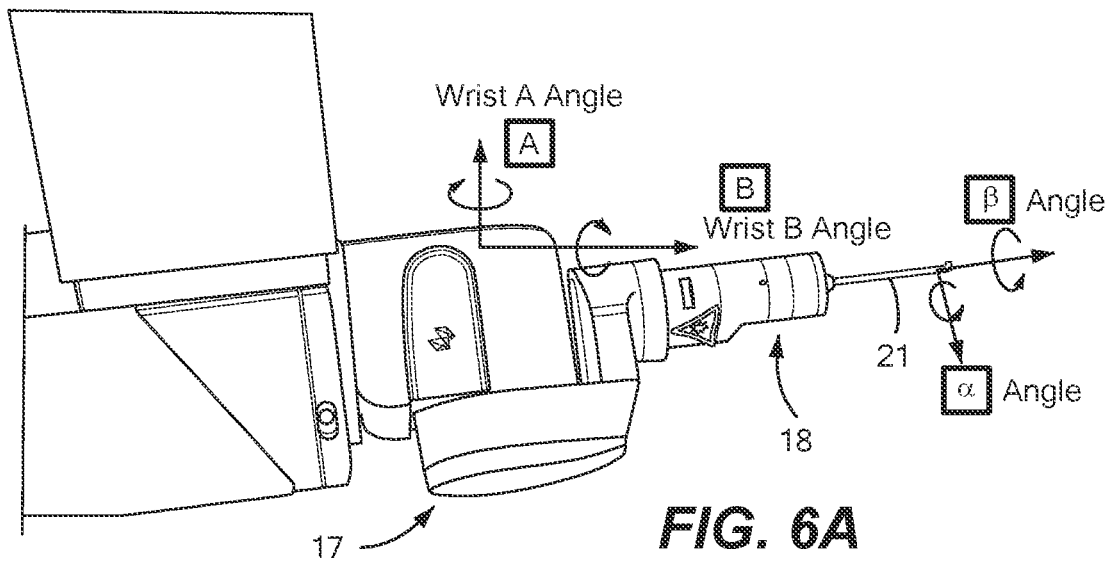
FIG. 6A
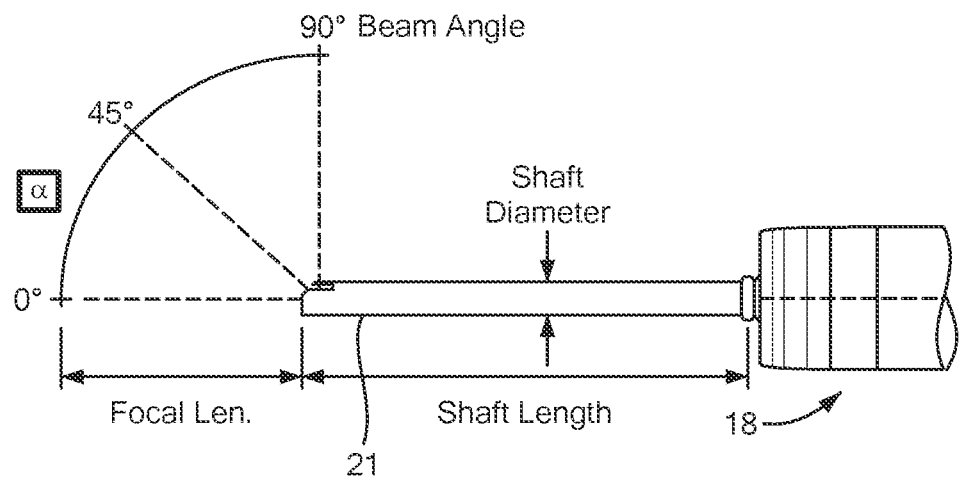
FIG. 6B
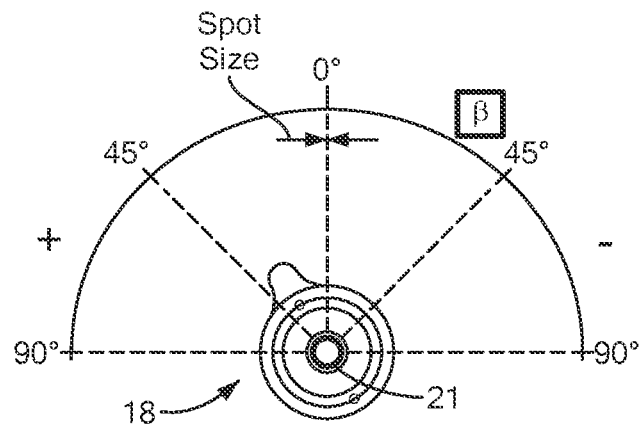
FIG. 6C Beam Rotation (A=0, B=0)

FIG. 8A  FIG. 8B

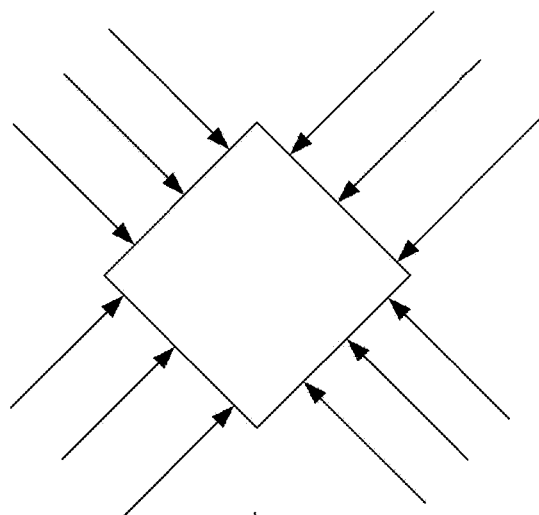
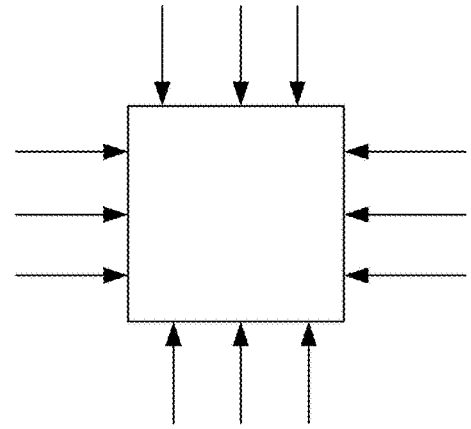
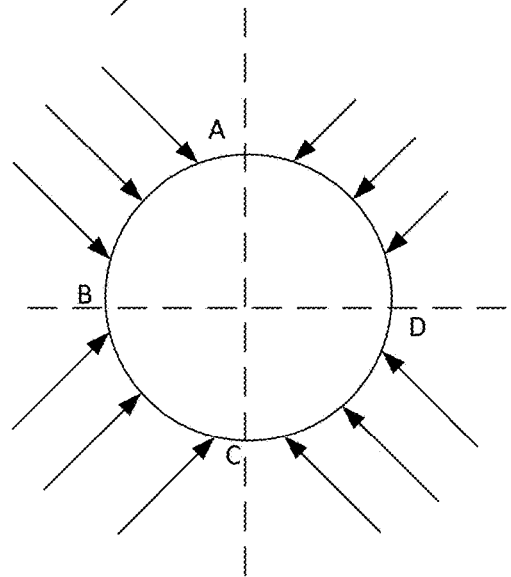
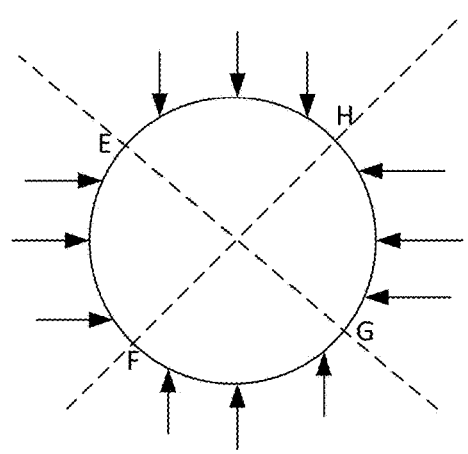
FIG. 8D          FIG. 8E

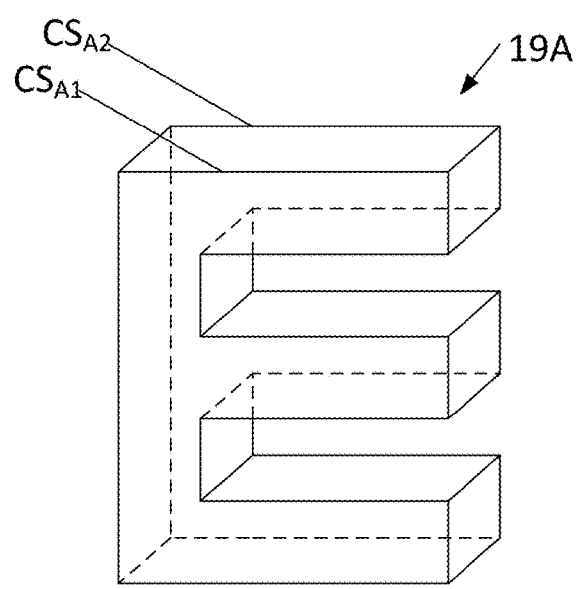 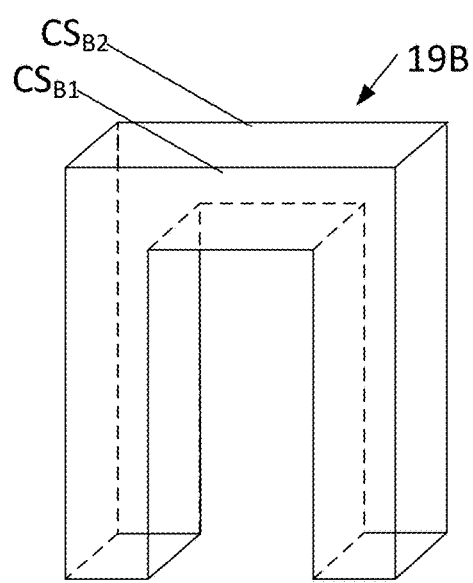
FIG. 8F  FIG. 8G

GENERATING EFFICIENT MEASUREMENT PROTOCOL USING SEGMENT GROUPING AND LIMITING TIME-DEPENDENT MEASUREMENT DEVIATIONS

PRIORITY

This patent application claims priority from provisional U.S. patent application Nos. 63/192,725, 63/192,761, 63/192,909, and 63/192,995, all filed May 25, 2021, each of which is incorporated herein, in its entirety, by reference.

FIELD OF THE INVENTION

Illustrative embodiments of the invention generally relate to coordinate measuring machines and, more particularly, illustrative embodiments relate to generating efficient scan paths for measuring the workpiece.

BACKGROUND OF THE INVENTION

Coordinate measuring machines (CMMs) are the gold standard for accurately measuring a wide variety of different types of physical objects/work pieces. For example, CMMs can measure critical dimensions of aircraft engine components (e.g., jet engine blades), surgical tools, and gun barrels. Precise and accurate measurements help ensure that their underlying systems, such as an aircraft in the case of aircraft components, operate as specified.

CMMs often quickly and efficiently measure objects having relatively simple geometries. For example, a CMM probe (i.e., the part of the CMM directly gathering the measurement data) typically can move relatively quickly around the outside surface of a uniform diameter gun barrel to gather the desired information. In such a case, the time to measure the gun barrel can be much less than the time to produce the gun barrel.

Objects with more complex geometries, however, can present a problem. For example, a jet engine blade often has an unusually complex geometry that complicates measurement. In that case, to ensure accurate measurements, the CMM probe often very slowly traverses about the blade. Undesirably, in some instances, the required time to measure a geometrically complex object can be unduly long; sometimes much longer than the time to manufacture the object itself. For example, the measurement time for objects having complex geometries may be three to five times longer than the manufacturing time.

SUMMARY OF VARIOUS EMBODIMENTS

In accordance with one embodiment of the invention, a method efficiently measures an object having a feature. The feature has a plurality of profiles each having a surface. The method provides a coordinate measuring machine having a wrist coupled with a measuring probe. The probe has a tolerance angle with respect to a surface normal of a surface to be measured. The wrist has a first given orientation that is adjustable to a second given orientation. The method segments an object to be measured into a plurality of segments as a function of a wrist orientation that can be used to measure a given segment within the tolerance. A first group of segments that can be measured within the probe tolerance using a first ideal vector is determined. A second group of segments that can be measured within the probe tolerance using a second ideal vector is determined.

The method may also measure the segments of the first group of segments. After measuring the segments of the first group of segments, the method may measure the segments of the second group of segments. The segments of the first group may be on a plurality of different cross-sections of a feature. Indeed, the segments of the first group may be on a plurality of different features of an object.

In some embodiments, the feature is a blade and the object is a blisk. In some embodiments, measurement segments from the second group are skipped to measure segments from the first group. Skipping measurement segments may include skipping segments that are closer in proximity to measure segments in a given group. In some embodiments, the plurality of segments are part of the same cross-section on the feature.

Illustrative embodiment determine a hardware orientation that corresponds to the ideal vector for each segment. The hardware includes a wrist and a probe. The wrist may be a non-continuous wrist.

Among other things, the method may select a first sub-group of the first group of segments to define a first block. The method may also select a second sub-group of the first group of segments to define a second block. The method may complete measurement of the first block prior to measurement of the second block. The method may also complete measurement of the entirety of the cross-sections associated with the first block prior to measurement of the second block.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 1B shows a variety of non-continuous wrists in accordance with illustrative embodiments of the invention.

FIG. 6A shows a side view of the wrist 17 and probe 18 in accordance with illustrative embodiments of the invention.

FIGS. 6B and 6C show a side view and a front view of an optical probe having a stylus in accordance with illustrative embodiments of the invention.

FIGS. 8A-8C schematically show a simple cross-section being segmented into measurement segments for measuring in accordance with illustrative embodiments.

FIGS. 8D-8E schematically show examples of the system analyzing multiple cross-sections to adjust segmentation in accordance with illustrative embodiments of the invention.

FIGS. 8F-8I schematically show four cross-sections from two features being segmented into measurement segments for measuring in accordance with illustrative embodiments.

DESCRIPTION OF ILLUSTRATIVE EMBODIMENTS

Illustrative embodiments generate an efficient scan path to measure a workpiece or a feature of the workpiece. In contrast to prior techniques, which measure the workpiece or feature along a continuous path or user-defined path, the scan path is generated by the system by segmenting the feature to be measured into smaller segments (also referred to as sections) by a fixed wrist angle of the coordinate measuring machine. Segments that can be measured with similar hardware orientations (e.g., same wrist angle) are grouped together and measured one after the other, even if these segments are discontinuous and/or located on different portions of the object or feature. Illustrative embodiments provide improved efficiency (i.e., reduced total measurement time) relative to proximity-based scans and/or user defined scans. Furthermore, all of the groups may be sub-categorized into different blocks and may be measured block-by-block to assist with measurement accuracy (e.g., to account for changes as a result of thermal expansion). Details of illustrative embodiments are discussed below.

Figure 1A:
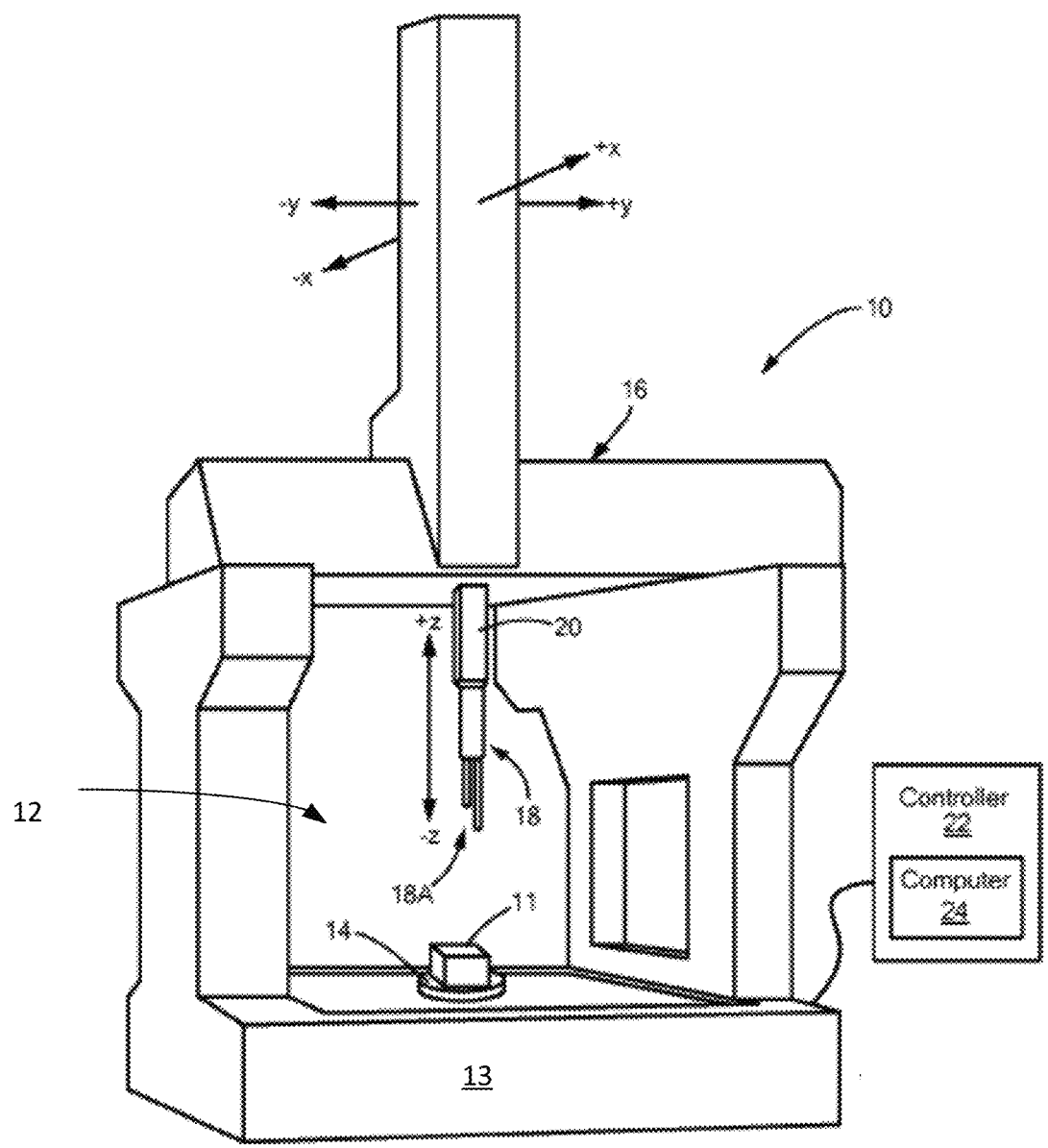
FIG. 1A schematically shows one type of coordinate measuring machine that may be configured in accordance with illustrative embodiments.

FIG. 1A schematically shows one type of coordinate measuring machine 10 (i.e., a CMM system, also referred to below as "CMM 10") that may be configured in accordance with illustrative embodiments. This CMM 10 is but one of a number of different types of CMMs that may implement various embodiments. Accordingly, such a CMM 10 is not intended to limit various embodiments of the invention.

As known by those in the art, the CMM 10, measures an object 11 (also referred to as a part or work piece) on its bed/base (referred to as "base 13"), which may be formed from granite or other material. Some objects 11 are measured to a fine precision, such as on the micron level. Generally, the base 13 defines an X-Y plane that typically is parallel to the plane of the floor supporting the CMM 10. In some embodiments, the base 13 supports a rotary table 14 that controllably rotates the object 11 relative to the base 13. Alternatively, the rotary table 14 may be integrated into a hole in the base 13. Sometimes, a fixture secures and orients the object 11 on the base 13 or rotary table 14.

To measure the object 11, the CMM 10 has movable components 16 (e.g., a carriage and other components not shown in FIG. 1A) arranged to move a measuring device 18, such as one or more contact or non-contact (e.g., optical) probes 18A coupled with a movable arm 20 (also referred to as a ram 20). Alternatively, or additionally, some embodiments move the base 13 with respect to a stationary measuring device 18. Either way, the movable components 16 of the CMM 10 manipulate the relative positions of the measuring device 18 and the object 11 to obtain the desired measurement within a measurement space 12 of the CMM 10. In either case, the movable components 16 (and its arm 20, discussed below) are movable relative to the base 13.

The CMM 10 has a control system 22 that controls and coordinates its movements and activities (shown schematically in FIG. 1A as "controller 22"), which may be internal to the CMM 10, external to the CMM 10, or have both internal and external components. Among other things, the control system 22 preferably includes hardware, such as dedicated hardware systems and/or computer processor hardware. Among other things, the computer processor may include a microprocessor, such as a member of the Intel "Core i7 or i9" family of integrated circuit microprocessors available from Intel Corporation, or a digital signal processor, such as a member of the TMSX20C66x family of digital signal processor integrated circuits from Texas Instruments Incorporated. The computer processor has on-board digital memory for storing data and/or computer code, including instructions for implementing some or all of the control system operations and methods. Alternatively, or in addition, the computer processor may be operably coupled to other digital memory, such as RAM or ROM, or a programmable memory circuit for storing such computer code and/or control data.

Alternatively, or additionally, some embodiments couple the CMM 10 with an external computer system 24 ("host computer 24"). Although FIG. 1A shows the computer system 24 as part of the control system, those skilled in the art should understand that it may be separate from the control system 22. In a manner similar to the control system 22, the host computer 24 has a computer processor such as those described above, and computer memory in communication with the processor of the CMM 10. The memory is configured to hold non-transient computer instructions capable of being executed by its processor, and/or to store non-transient data, such as 1) scan path data used to guide the movable portions (e.g., the measuring device 18, the wrist 17, movable arm 20, etc.) during a measurement scan, and/or 2) data acquired as a result of the measurements of the object 11 on the base 13.

Because their relative positions typically are determined by the action of the movable components 16, the CMM 10 may be considered as having knowledge about the relative locations of the base 13, the rotary table 14, the object 11 on the rotary table 14, fixturing that supports the object 11, and the measuring device 18. More particularly, the control system 22 and/or computer system 24 may control and store information about the motion of the movable components 16. Additionally, or alternatively, the movable components 16 of some embodiments include sensors that sense the locations of the base 13 and/or measuring device 18, and report that data to the control system 22 and/or the computer system 24. The information about the motion and position of the base 13 and/or measuring device 18 of the CMM 10 may be recorded in terms of a one-dimensional, two-dimensional (e.g., X-Y; X-Z; Y-Z) or three-dimensional (X-Y-Z) coordinate system referenced to a point on the CMM 10. This coordinate system may be referenced to a point on the base as stated above, which is static within the system, or it can be referenced to a point on the rotary table. In some embodiments, the reference coordinate system spins with the table as it rotates. This is common in applications using rotary tables 14 on a CMM 10.

The CMM 10 may have more than three degrees of freedom; i.e., more degrees of freedom in this example than in the X, Y, and Z directions. For example, the end of the arm 20 may include a wrist 17 mechanism that rotates the measuring device 18/18A, thus providing up to three more degrees of freedom. Illustrative embodiments may use a continuous wrist (indexable/adjustable orientation during measurement) or non-continuous wrist (fixed orientation wrist during measurement). In the prior art, continuous wrists generally provide faster measurements that non-continuous wrists, but are considerably more expensive. Illustrative embodiments may also provide faster scan speeds and/or make setting up quicker (e.g., as opposed to continuous wrists that may require additional time to setup to avoid collision during continuous wrist measurement). The inventors believe that illustrative embodiments enable CMMs 10 with non-continuous wrists to scan objects 11 faster than CMMs 10 with continuous wrists. Furthermore, illustrative embodiments provide improved scanning over current state of the art CMMs 10 using non-continuous wrists.

FIG. 1B shows a variety of non-continuous wrists 17 in accordance with illustrative embodiments of the invention. The wrist 17 is the interface (or part thereof) between the CMM arm 20 and the end-effector (e.g., measuring probe 18). "Non-continuous" refers to wrists 17 whose orientations, relative to the CMM 10 arm 20, cannot be adjusted during measurement.

The non-continuous wrist 17A is discretely indexable when the CMM 10 is not measuring (e.g., between measuring different segments of the object 11). Discretely indexable wrists 17A can be adjusted in a set range of motion (e.g., in increments of 2 degrees) when the CMM 10 is not measuring. In contrast, continuous wrists are adjustable during measurement, and generally are not limited to discrete adjustments.

The wrist 17A may be directly or indirectly coupled with the end effector (e.g., the probe 18). The probe 18 is interchangeable from the wrist 17 and includes at least one stylus. The wrist 17B shows a probe 18 with five styli 21. In some embodiments, the probe 18 may include an interchangeable sensor. Alternatively, the sensor may not be included in the probe 18. The non-continuous wrist 17B is a non-continuous and non-indexable wrist. The non-continuous discretely indexable wrist 17C is in a horizontal orientation. It should be noted that the probe 18 itself may include interchangeable components (e.g., the probe head may be interchangeable to change stiffness responses for contact probes 18).

Figure 2:
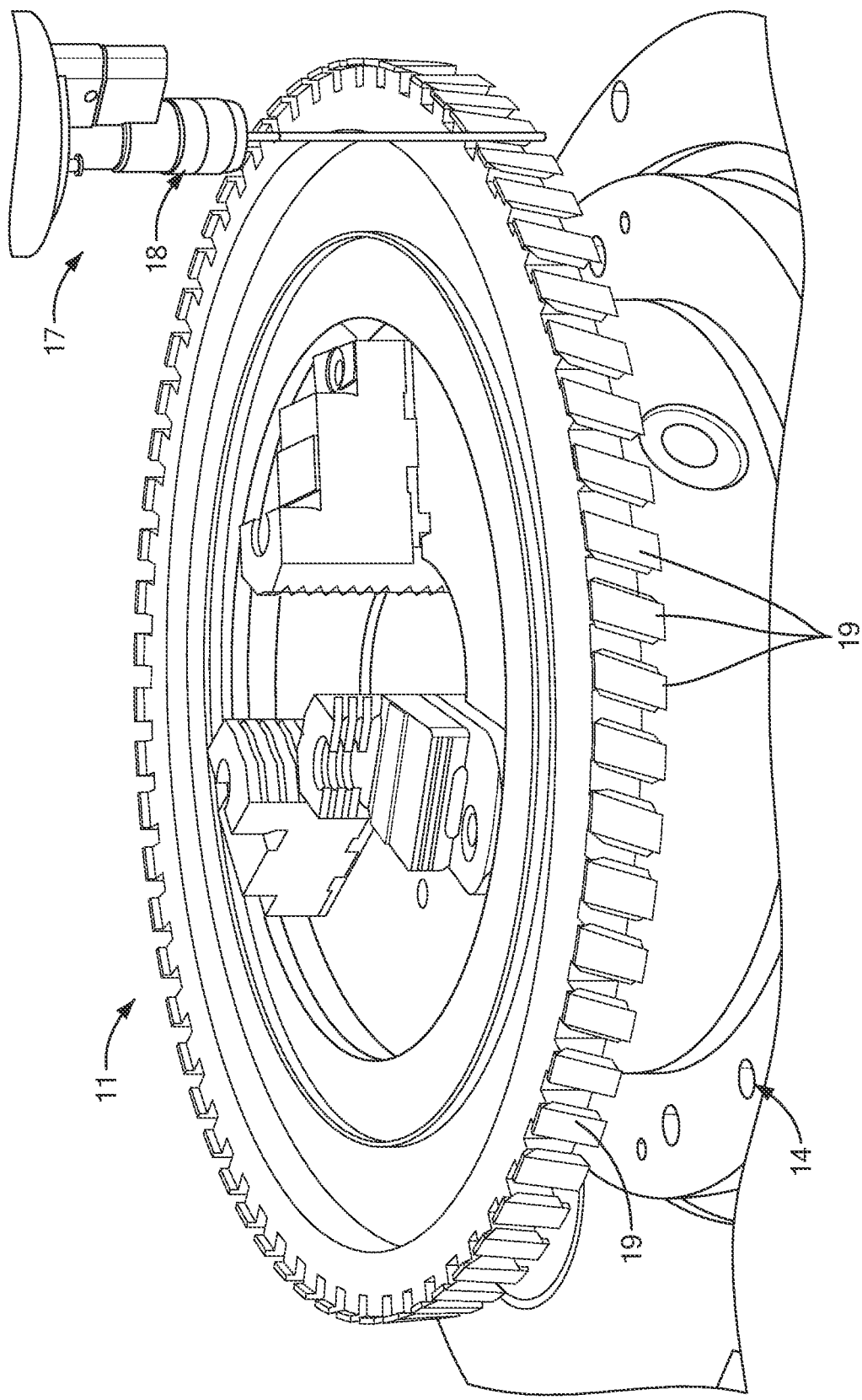
FIG. 2 shows the object on a rotary table being measured by the CMM in accordance with illustrative embodiments of the invention.

FIG. 2 shows the object 11 on a rotary table 14 as it is measured by the CMM 10 in accordance with illustrative embodiments of the invention. In particular, one or more features 19 of the object 11 may be measured. For example, the object 11 in FIG. 2 is a blisk 11. The blisk 11 has a number of features 19 that can be measured, such as the blade 19. The measuring device 18 shown is an optical probe 18 mounted to the non-continuous wrist 17. Although the blade 19 is provided as an example of a feature 19, it should be understood that the measurement feature 19 may be a portion thereof (e.g., a portion of the blade 19). The feature 19 refers to the particular portion of the object 11 that is to be measured. Furthermore, measuring the object 11 may refer to measuring a specific feature 19 of the object 11. However, for clarity, the feature 19 does not have to be the entirety of some feature 19 (e.g., such as the entirety of the blade 19). Various embodiments may measure a plurality of features 19 of the object 11.

For the sake of discussion, various examples of illustrative embodiments refer to measuring the blades 19 of the blisk 11. However, it should be understood that these are merely examples, and that illustrative embodiments may be used to measure a variety of different objects 11 and features 19. Thus, discussion of measuring the blades 19 generally applies to any type of measurement feature 19 (e.g., including portions of the blade 19). Reference to the blades 19 as features 19 is for discussion purposes only and is not intended to limit various embodiments. Indeed, discussion of the blades 19 and/or measuring the blades 19 also is generally applicable to any type of feature 19 (e.g., a non-blade feature 19).

Figure 3:
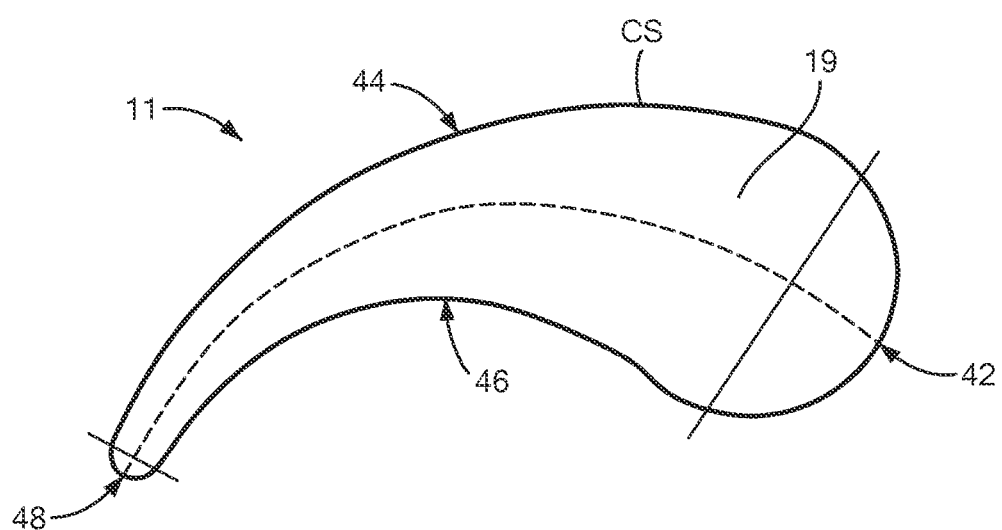
FIG. 3 schematically shows a theoretical cross-section of a portion of the blade in accordance with illustrative embodiments.

FIG. 3 schematically shows a theoretical cross-section of a portion of the blade 19 in accordance with illustrative embodiments. Illustrative embodiments may measure the entire cross-section (e.g., leading edge 42, convex portion 44, trailing edge 48, and concave portion 46) in a single continuous motion using a continuous wrist, and assuming that there is sufficient space to maneuver the probe 18 between blades 19. However, a continuous scan cannot be performed by the non-continuous wrist 17. As known by those skilled in the art, the non-continuous wrist 17 can change orientation (e.g., relative to the CMM arm 20) between measurements, but maintains a consistent orientation during measurement. Illustrative embodiments may reduce total measurement time such that CMMs 10 using non-continuous (non-indexable) wrists 17 outperform CMMs 10 using continuous wrists 17. Additionally, or alternatively, illustrative embodiments may improve the performance of continuous wrists 17.

Figure 4A:
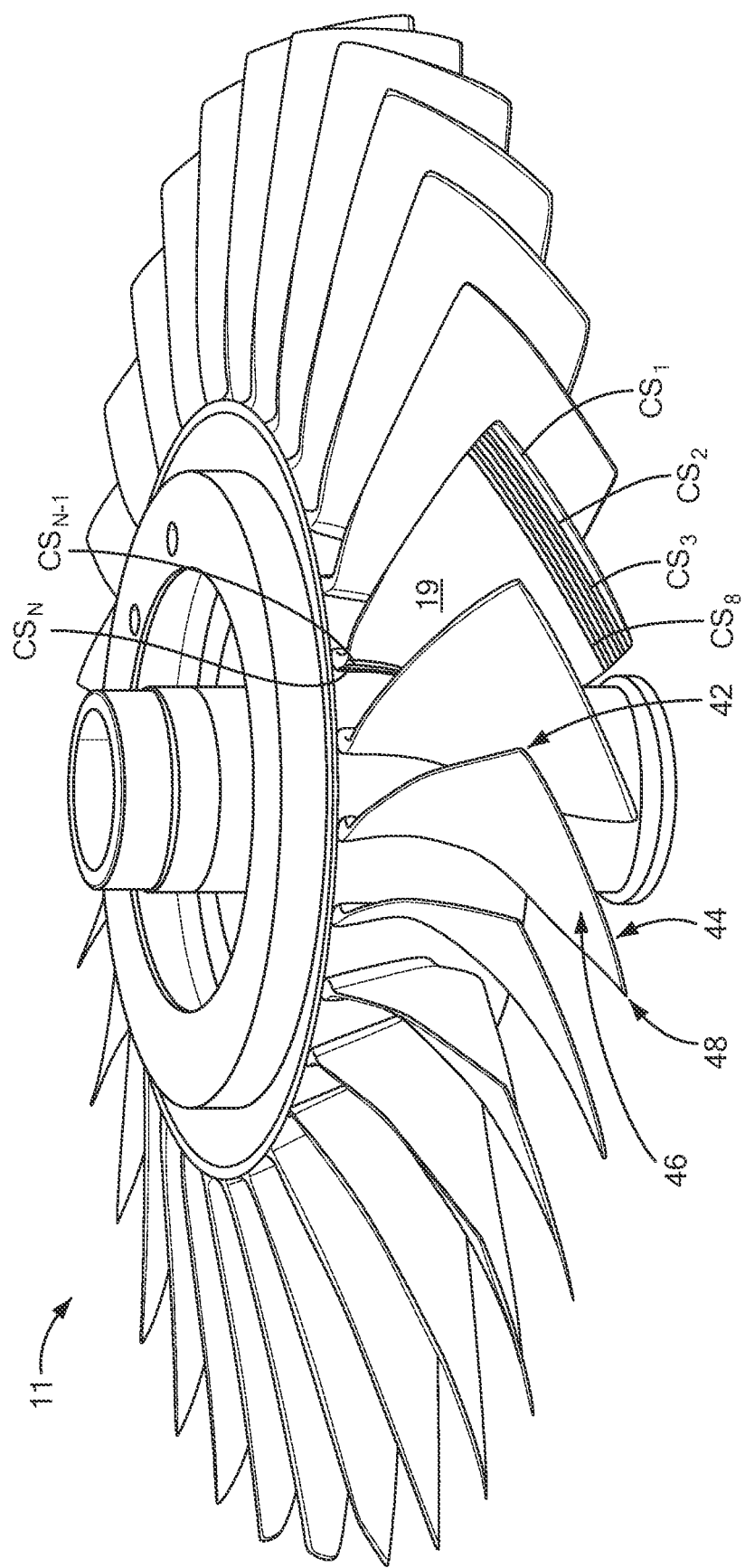
FIGS. 4A-4B show close-up views of the blade segmented in accordance with illustrative embodiments of the invention.
Figure 4B:
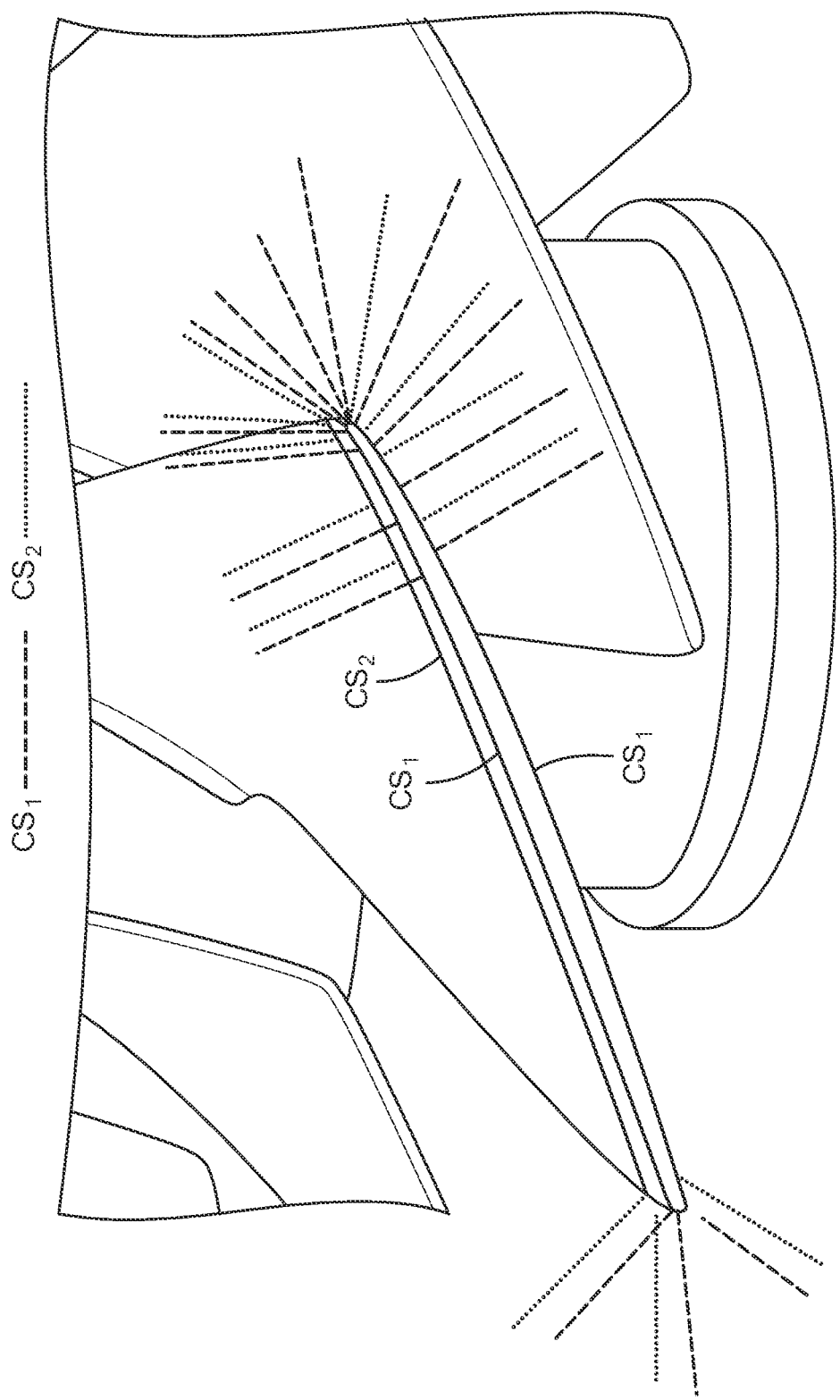

FIGS. 4A-4B show close-up views of the feature 19 (e.g., blade 19) segmented in accordance with illustrative embodiments of the invention. Although FIG. 3 shows a cross-section for the blade 19, one of skill in the art understands that the blade 19 may twist or have varying geometric properties, such that the cross-section shape and size may vary along the length of the blade 19. For the sake of discussion, the blade 19 may be considered to have a number of cross-sections (CS1 to CSN) that are to be measured.

Assuming that all cross-sections CS1 to CSN are to be measured, some embodiments may measure the entirety of each cross-section (e.g., CS1) before moving to the next cross-section (e.g., CS2). For non-continuous wrists 17, measuring the entirety of each cross-section is time consuming. This is because the wrist 17 angle/orientation must change to accommodate the measurement surface. For example, as shown in FIG. 3, the wrist 17 orientation may need to be changed to measure each of the leading edge 42, the convex surface 44, the concave surface 46, and the trailing edge 48. Each of these changes in wrist 17 orientation is time consuming and delays the measurement process.

Furthermore, these scan paths are usually brute force coded, such that they do not consider variation in part geometry (e.g., throughout a single blade 19) such that wrist 17 angles are not optimized for the particular tolerances desired. This process is furthermore time consuming to code for one or more engineers.

Figure 4C:
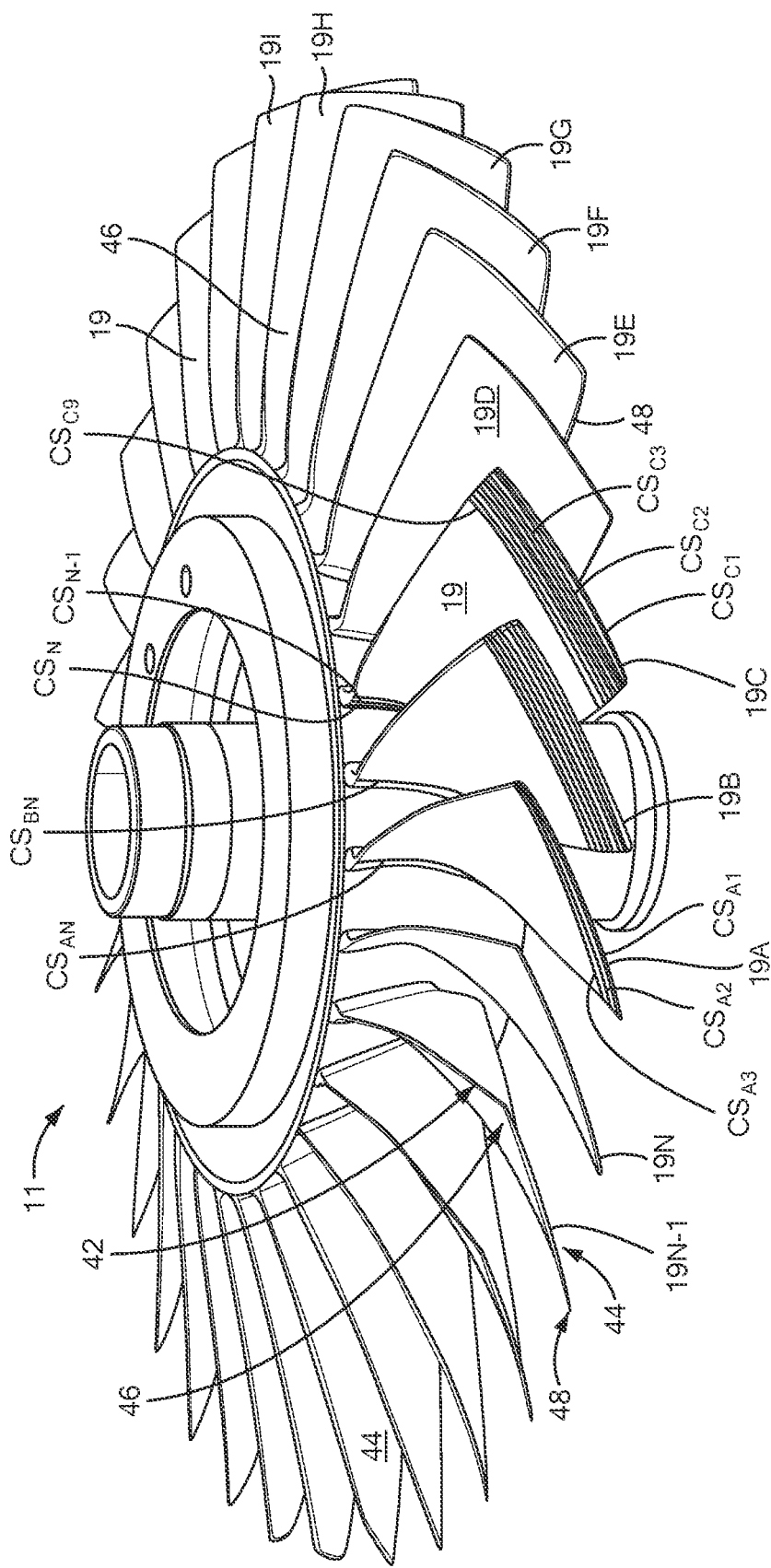
FIG. 4C schematically shows the object in accordance with illustrative embodiments of the invention.

FIG. 4C schematically shows the object 11 in accordance with illustrative embodiments of the invention. For the sake of discussion, the object 11 may be a blisk 11 having multiple blades 19 to be measured. Accordingly, the blades 19 may be the features 19 to be measured.

As described in co-pending U.S. provisional application No. 63/192,725, which is incorporated herein by reference in its entirety, the features 19 to be measured are segmented. For example, for a particular application, it may be desirable to measure the entire profile of each of the blades 19A-19N. Here the "N" nomenclature is used to signify the last blade 19 in the series of blades 19, without any particular limitation regarding the total number of blades 19 on the blisk 11.

In general, the CMM 10 may measure each blade 19 section by section (e.g., cross-section by cross-section). For the sake of discussion, cross-sections are illustrated on some of the blades 19. It should be understood that in practice the cross-sections may be closer or further apart than shown, but in FIG. 4C the cross-sections are shown separated for ease of discussion. The blade 19A has cross-sections $CS_{A1}$ to $CS_{AN}$. In a similar manner, the blade 19B has cross-sections $CS_{B1}$ to $CS_{BN}$. Each of the blades 19A-19N may follow a similar nomenclature.

Figure 4D:
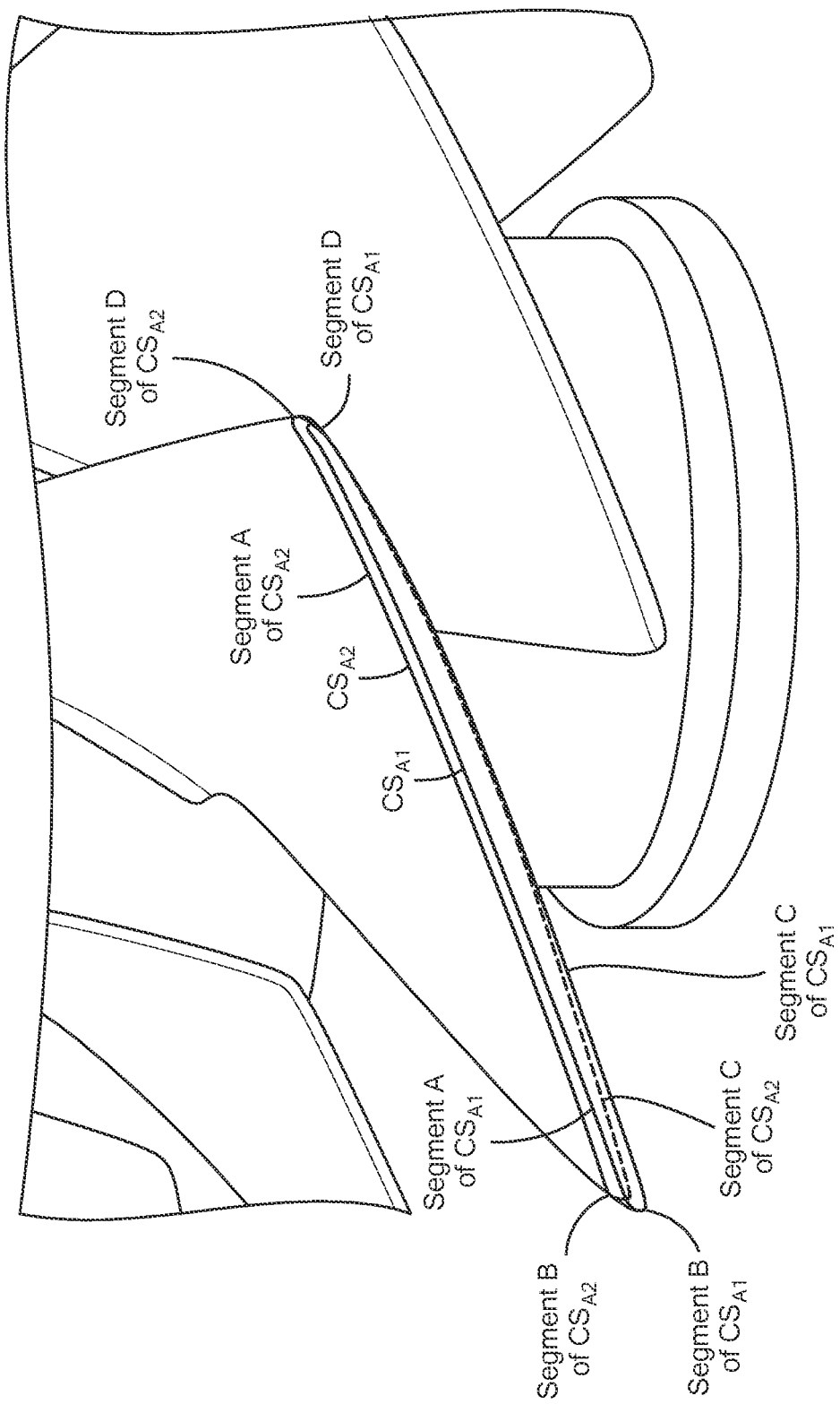
FIG. 4D schematically shows a close-up view of the feature in accordance with illustrative embodiments of the invention.

FIG. 4D schematically shows a close-up view of the feature 19A in accordance with illustrative embodiments of the invention. Illustrative embodiments may segment each feature 19 based on an ideal vector that can be used to measure the entirety of that segment. For the sake of discussion, FIG. 4D shows each of the cross-sections having four segments. For example, $CS_{A1}$ has four segments roughly corresponding to the concave portion 46 (segment A), the trailing edge 48 (segment B), the convex portion 44 (segment C), and the leading edge 42 (segment D). In a similar manner, $CS_{A2}$ is shown having four segments that correspond to same portions of the cross-section. Although only four segments are shown per cross-section, this is not intended to limit various embodiments. Indeed, embodiments may segment a particular cross-section into many more segments (e.g., 5, 6, 8 or more). However, four segments are shown for ease of discussion.

After segmentation, illustrative embodiments may group together segments that can be measured by the same ideal vector (e.g., within a tolerance of the ideal vector provided by the user or the system). To make this determination, the surface normal of each measurement point in the segment is considered. The surface normal vector (also referred to as surface vector) should be received/derived directly from an input, either as a numerical value or pulled form a CAD surface. If the surface normal of two segments are measurable by the same ideal vector, then the segments are grouped together.

Thus, in the example of FIG. 4D, the system may determine that Segment A of $CS_{A1}$ may be grouped with Segment A of $CS_{A2}$, Segment B of $CS_{A1}$ may be grouped with Segment B of $CS_{A2}$, Segment C of $CS_{A1}$ may be grouped with Segment C of $CS_{A2}$, and Segment D of $CS_{A1}$ may be grouped with Segment D of $CS_{A2}$. The result is four different groups of segments, where each group can be measured using a single ideal vector (i.e., each of the groups may be measured with a single ideal vector, which is to say 4 different ideal vectors are required to measure the 4 groups).

Although the above example describes grouping of segments from only two different cross-sections, it should be understood that each feature 19 has many cross-sections. Thus, all of the various segments that can be measured using a single ideal vector can be grouped together regardless of cross-section. Furthermore, groups may span across more than a single blade 19. In some embodiments, segments from multiple different features 19 and/or objects 11 may be grouped together.

Returning to FIG. 4C and expanding the above example, Group A may include all of the "A" segments from cross-sections A1 to cross-section AN, Group B may include all of the "B" segments from cross-sections A1 to cross-section AN, Group C may include all of the "C" segments from cross-sections A1 to cross-section AN, and Group D may include all of the "D" segments from cross-sections A1 to cross-section AN.

Furthermore, groups can be expanded to include segments from other blades 19B-19N that can be measured using the same ideal vector as the respective group. For example, Group A may include all of the A segments from blade 19A (e.g., every A segment from cross-sections A1-AN), as well as all of the A segments from blade 19B (e.g., every A segment from cross-sections B1-BN), and so forth until all of the A segments from all of the blades (e.g., to the blade 19N) are part of the group. This process can be repeated for every group.

Illustrative embodiments then measure the object 11 by group. For example, all of the segments in group A are measured with a first hardware orientation, then the hardware orientation is adjusted and all of the segments in group B are measured with a second hardware orientation, then the hardware orientation is adjusted and all of the segments in group C are measured with a third hardware orientation, then the hardware orientation is adjusted and all of the segments in group D are measured with a fourth hardware orientation. Although the present example describes four groups (Group A to Group D), it should be understood that illustrative embodiments may include fewer or more groups. The above described process can be accommodated to the number of groups of segments.

It should be understood by one of skill in the art that each of the various groups can ultimately be measured without a wrist change. Thus, group A can be measured by a first wrist orientation, and group B by a second wrist orientation. The inventors discovered that by measuring by group, rather than from a pre-programmed path or proximity basis, that overall measurement time is reduced. The inventor was surprised by the magnitude of reduction, as quantified below. Prior to testing, the inventor did not think to calculate the time savings in the way described below, as the time to change hardware orientations seems relatively small to an observer, until the net effect is realized on the final throughput. The inventors attribute this advantageous reduction in measurement time to the reduction of low-value added motion. For example, if a cross-section requires four different wrist orientations to measure, that means that the wrist orientation has to be changed four times. Each change of wrist orientation can take somewhere on the order of 2-7 seconds (3-4 is more typical but this is dependent on the hardware, some hardware is much slower or faster than others). Instead, by measuring groups of segments with a single orientation, the intermediate changing time is substantially reduced, and the overall measurement time is substantially reduced. This is contrast to prior art methods which generally measure all of the blade in order (e.g., blade A, then blade B, then blade C).

The time loss incurred by the prior art is proportional to the number of blades 19 on the part 11 to be measured.

Illustrative embodiments may provide a time savings that can be quantified as [(N*X)−(N)]*T Where N is the number of groups, X is the number of features (e.g., blades) and T is the time cost of adjusting the hardware orientation. X could typically be between 25 and 60 for a blisk. N would typically be 6 to 9 with illustrative embodiments, but could be 7-13 in the prior art. T for an indexable wrist typically is at least 3 seconds but could be up to 7 seconds.

In the examples provided previously, Group A was described as including all of the A segments from blade 19A (e.g., every A segment from cross-sections A1-AN). However, in practice, not every cross-section having a concave portion will qualify for Group A (this also goes for the other groups as well). This is because the shape and the orientation of the feature 19 may change moving from section to section. For example, cross-sections A1-A3 and C1-C3 have very similar concave 46, convex 44, leading edge 42, and trailing edge 48 segments. Therefore, it is likely that the segments of these cross-sections will be grouped together into four segment groups. However, the blade 19 has a twisted geometry along its length. For example, cross-section AN and CN have concave portions with surface normals that are substantially different (e.g., almost 90 degrees) from the surface normal of the concave portions of cross-section A1 and C1. Therefore, it is possible (and even likely) that the concave segments of cross-sections (A1 and AN) will not be grouped together (e.g., because they are not within the angle of tolerance of the same ideal vector).

Indeed, it is possible that the leading edge 42 segment of cross-section AN may be grouped with the concave segment of cross-sections A1 and A2. It should therefore be noted that segments groups are not necessarily a function of shape (e.g., convex vs. concave), but instead, are a function of the ideal vector that can be used to measure a particular segment.

The inventor was further surprised to find that in some instances, some groups may skip entire cross-sections. For example, CS1-CS10 may have segments in group A, and CS25-CSN may have segments in group A, but CS11-CS24 may have no segments in group A. Therefore, when measuring group A, the CMM 10 may skip over certain cross-sections (e.g., CS11-CS24). It should be understood that this can also be applied to various features 19 to be measured. For example, some embodiments may have Group A segments in blade 19A and 19C, but not in blade 19B. Accordingly, when measuring Group A segments, blade 19B is skipped entirely. For example, skipping blades can be fairly typic, as blisks can sometimes have varying geometries every other blade.

Figure 5:
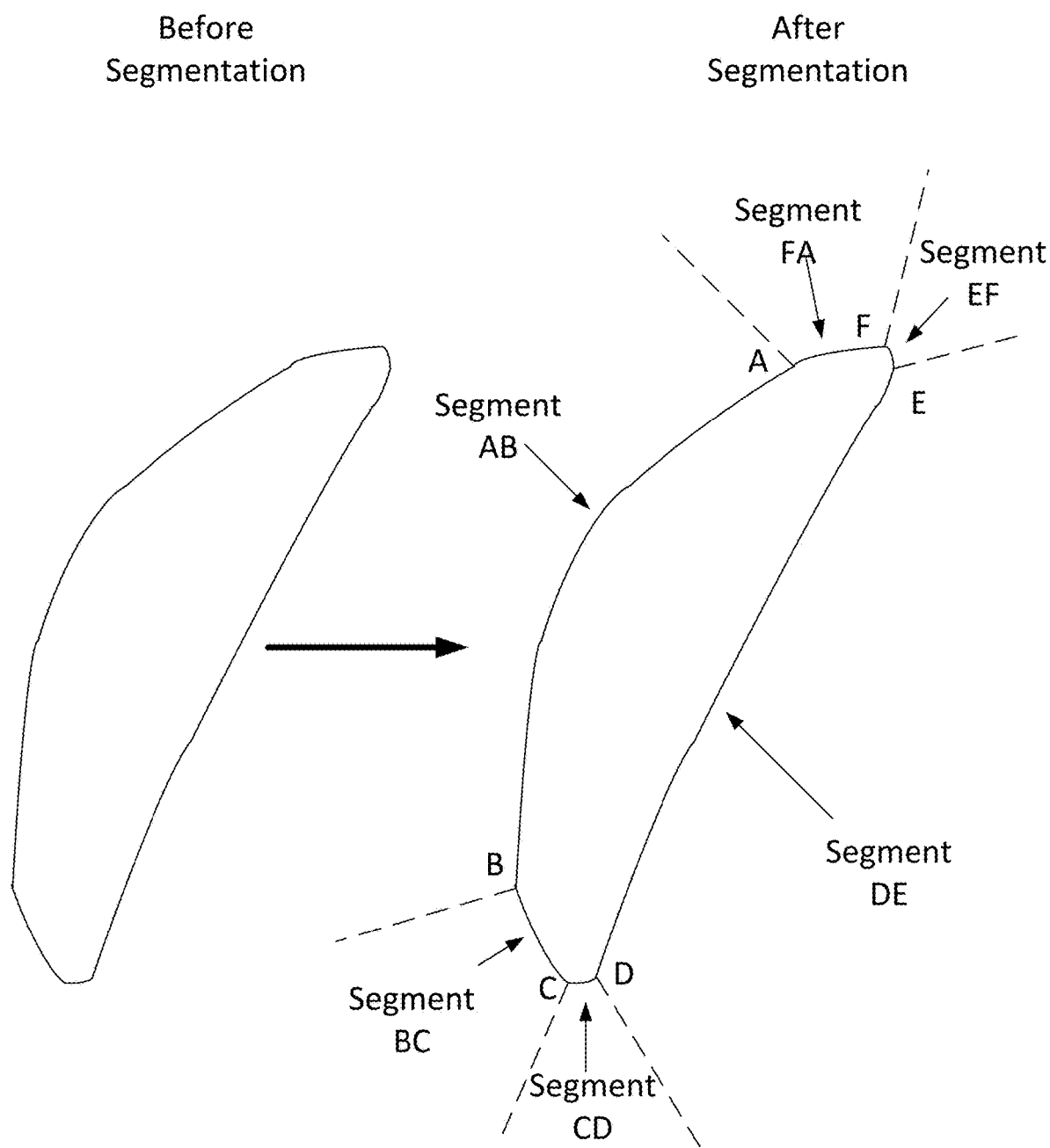
FIG. 5 shows a cross-section prior to segmentation and after segmentation in accordance with illustrative embodiments.

FIG. 5 shows a cross-section prior to segmentation and after segmentation in accordance with illustrative embodiments. On the left is the cross-section before segmentation. On the right side is the cross-section after segmentation. In particular, the cross-section has been segmented into 6 different sections (segment AB, segment BC, segment CD, segment DE, segment EF, and segment FA). Each segment corresponds to a single fixed wrist 17 orientation that can be used to measure the entirety of the segment while maintaining acceptable measurement tolerances. In practice, the measurements may be continuous or may have a large number of discrete measurement points.

FIG. 6A shows a side view of the wrist 17 and probe 18 in accordance with illustrative embodiments of the invention. FIGS. 6B and 6C show a side view and a front view of the optical probe 18 having a stylus 21 in accordance with illustrative embodiments of the invention. The wrist 17 may be adjusted to control angles A and B, both of which impact the final orientation of the measurement beam.

In general, the beam path is not adjustable relative to the probe 18. The orientation of the beam (e.g., relative to the probe 18 and/or stylus 21) is fixed. Specifically, the angles α and β are generally not adjustable. Instead, to change angles α and β, the user can change the end effector or probe 18. To adjust the beam path, the wrist 17 has the ability to index about A or B. In order to change angle A and/or angle B, the wrist 17 adjusts the orientation of the probe 18. As known by those skilled in the art, the angles A and B are not adjustable during measurement with non-continuous wrists 17. However, angles A and B are adjustable during measurement by continuous wrists 17.

Illustrative embodiments determine an ideal orientation of the beam with which to measure a segment. In various embodiments, the ideal orientation of the beam has a nearest corresponding hardware orientation. There may be one or more options that are equivalently ideal, or in some cases there may be only one answer. For example, some embodiments may use a variety of different rotation angles for the angle A, but the angle B should be a specific value, or vice-versa.

Using the wrong angle(s) may result in degradation of the raw measurement data. This may result in failure to measure effectively or needing to negatively adapt other parts of the measurement (more wrist angles, slower scan speed, etc.). A "wrong" angle includes an angle of approach to the measurement surface that is beyond some threshold angle at which measurement tolerance is acceptable. For example, with an optical probe, the ideal measurement angle is where the beam is coincident with the normal of the measurement surface. As another example, a tactile probe may be oriented close to perpendicular to the normal of the surface (e.g., to avoid "stiction"). Regardless of the probe, one skilled in the art can determine the desired approach angle of the probe 18 and/or the beam, and illustrative embodiments may determine the appropriate wrist angle for achieving a desirable orientation with which to measurement a point and/or segment.

Illustrative embodiments have a tolerance that defines how far off the beam (or other measurement probe) can be relative to the surface normal while still maintaining accurate measurement data. Accordingly, illustrative embodiments calculate the wrist 17 orientation such that the beam is within tolerance with respect to the surface normal of the segment to be measured. Various embodiments may use a variety of tolerances based on the corresponding hardware, scan settings, and the material of the object to be scanned, such as +−5 degrees (e.g., on a shiny surface), +−30 degrees, or +−40 degrees. The total angle that can be accurately measured relative to the surface normal defined by the tolerance requirement is referred to as the angle of inclusion. Illustrative embodiments may use a variety of different angles of inclusion based on the corresponding hardware, scan settings, and the material of the object to be scanned e.g., 10 degrees (e.g., on a shiny surface), 60 degrees, or 80 degrees.

Various embodiments determine an orientation of the measurement apparatus 18. For example, the orientation of the beam for an optical probe, the orientation of the stylus for the tactile probe, etc.

Returning to FIG. 5, the acceptable level of measurement tolerance and the corresponding angle of inclusion are used to segment the cross-section into a number of sections that each correspond to a single measurement wrist 17 angle that allows the probe 18 to accurately measure the segment. When the CMM 10 measures the object 11, there are generally only a subset of surfaces that can be accurately measured using a given wrist 17 orientation. It should be understood that although reference is made herein to the wrist 17 angle, the measurement beam path also depends on the orientation of the end effector 18. The wrist 17 and the end effector 18 work together to produce the beam path. Thus, the wrist 17 angle is an ideal calculated so that the end effector 18 may accurately measure the segment based on a given probe 18 orientation.

For a simplified example, if probe A projects the beam vertically downward (e.g., −90 degrees), probe B points the beam horizontally (e.g., 0 degrees), and the ideal measurement vector is diagonally downward to the right (e.g., −45 degrees), the calculated wrist 17 angle used to measure the same segment differs for each of the probes. This is because each probe has a different ideal wrist 17 angle for measuring the surface/segment. In the above example, probe A wrist angle is +45 degrees and probe B wrist angle is −45 degrees, i.e., the wrist 17 adjusts the beam path for each of the probes 18 to end up in identical beam paths.

In general, the smaller the measurement tolerance, the fewer portions of a non-linear surface a particular wrist 17 orientation can accurately measure. On the other hand, the higher the tolerance, the more portions of a non-linear surface a particular wrist 17 orientation can accurately measure. A given wrist 17 orientation can be used to measure a single non-linear surface, the extent to which this is possible is determined by the measurement tolerance and the angular difference between the surface normals of various measurement points of the non-linear surface. Thus, the higher the tolerance, the fewer number of wrist 17 orientation adjustments. Fewer wrist 17 adjustments result in less non-value add motion (e.g., motion during which measurement data is not actively collected) and better throughput.

In some embodiments, the segments are broken up such that the angular difference between the surface normal at endpoints of the various segments are substantially the same. For example, the magnitude of the angle (also referred to as the angular difference) between the normal at point A and the normal at point B, is substantially the same as the magnitude of the angle between the normal at point B and the normal at point C, the magnitude of the angle between the normal at point B and the normal at point C, the magnitude of the angle between the normal at point C and the normal at point D, the magnitude of the angle between the normal at point D and the normal at point E, the magnitude of the angle between the normal at point E and the normal at point F, and the magnitude of the angle between the normal at point F and the normal at point A.

Figure 7A:
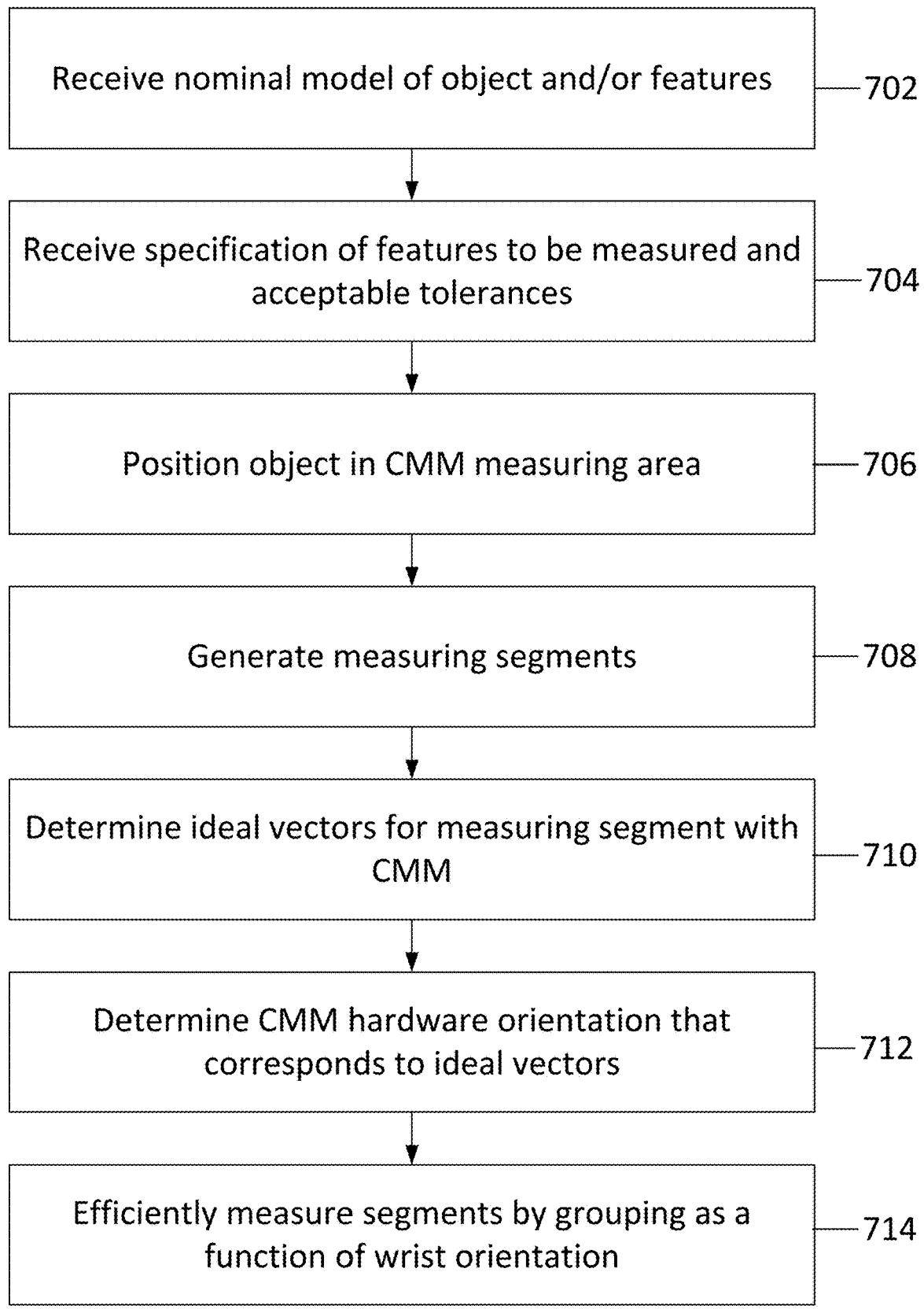
FIG. 7A shows a process of efficiently measuring the object in accordance with illustrative embodiments of the invention.
Figure 8C:
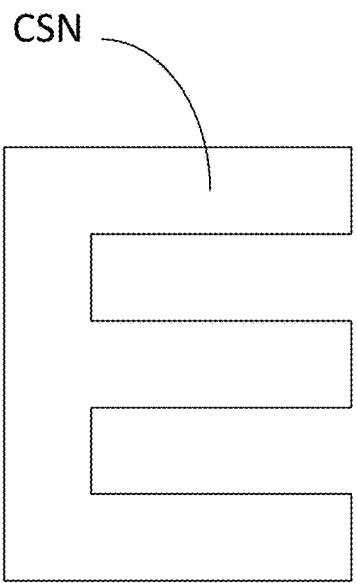
Figure 8C:
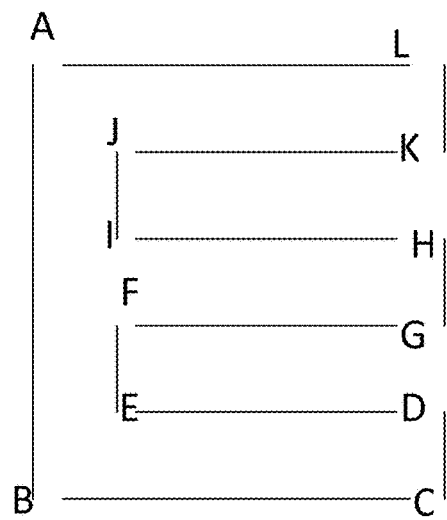
Figure 8C:
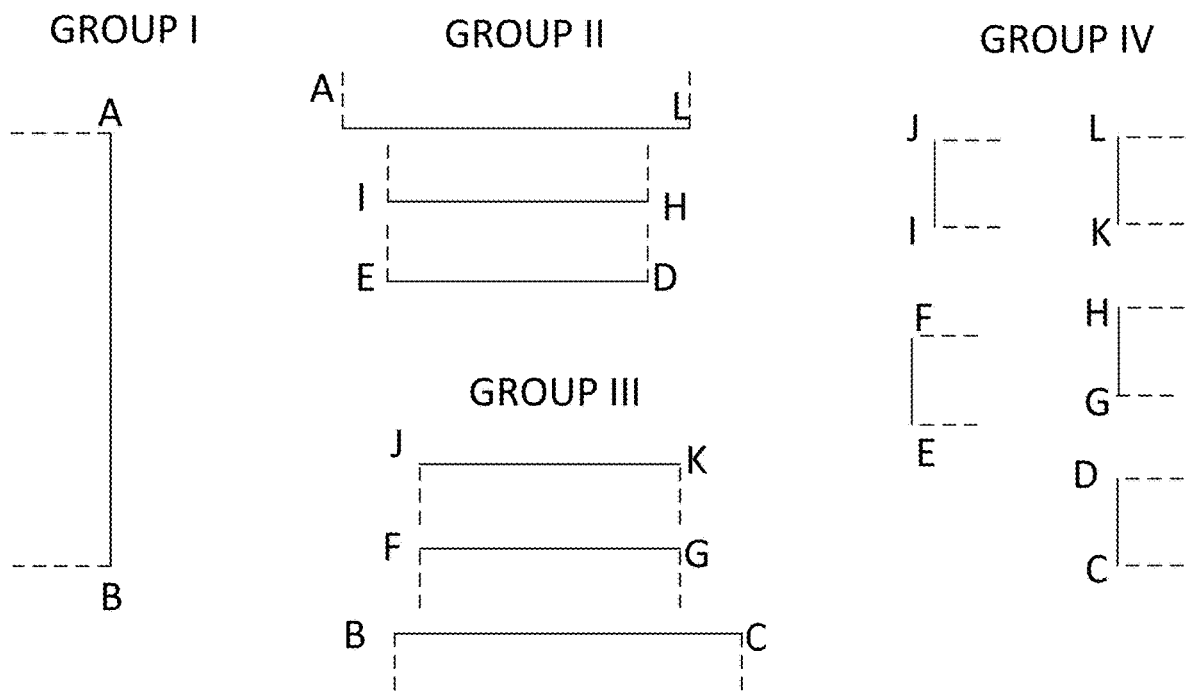

FIG. 7A shows a process of efficiently measuring the object 11 in accordance with illustrative embodiments of the invention. For the sake of ease of discussion, the process of FIG. 7A is described with reference to FIGS. 8A-8C. FIGS. 8A-8C schematically show a simple cross-section being segmented into measurement segments for measuring in accordance with illustrative embodiments.

The process begins at step 702, which receives a nominal model (e.g., CAD) of the object 11 and/or features 19 to be measured. For example, a CAD model of the blisk 11 having the blades 19 may be received. As shown in FIG. 8A, a CAD model may be received for a part having a "E" shaped cross-section CSN.

The process then proceeds to step 704, which receives specifications of features to be measured and/or acceptable tolerances. For example, it may be desirable to measure the outer-perimeter (or a portion thereof) of the cross-section CSN. There may also be a measurement tolerance within which the measurement must be performed.

The process then proceeds to step 706, which positions the object 11 in the CMM measuring area 12 to be measured. When the object 11 is positioned in the measuring area 12, the CMM 10 may register the relative orientation and position of the object 11 relative to the measuring area 12 and the model. Illustrative embodiments may use fixtures, fiducials or other known methods for the registration of the physical workpiece 11 within the CAD model. Discussion of this registration is beyond the scope of the present application and is well known in the art.

The process then proceeds to step 708, which generates measuring segments. Various embodiments may use CAD software, such as Quindos and/or PC-DMIS to optionally convert the CAD model to a set of discrete points or point cloud that includes points that are to be measured. The system analyzes the cross-section (e.g., the point cloud of the cross-section) to determine what portions of the cross-section that are to be measured (e.g., the feature 19 or a portion thereof) are measurable by the probe 18 (e.g., the probe 18 beam is normal to the surface of the segment or within the specified angular tolerance of normal to the surface) using a particular wrist 17 orientation. As mentioned previously, one method for achieving segmentation is to segment the cross-section such that an angle formed between the surface normal (represented by dashed lines) at endpoints of each segment is substantially minimized. Alternatively, the cross-section may be segmented such that the angle between the surface normal at endpoints of each segment are substantially the same.

However, in instances where a segment has one or multiple inflection points in their curvature, the above noted method may be inaccurate. Accordingly, preferred illustrative embodiments may determine an angle formed between the two most dissimilar surface normal vectors within the segment. For example, the two most dissimilar angles may be determined by finding the two normal vectors within any one segment that have the greatest angular difference of any vector pair within that segment. The system generates segments such that an angle formed between the surface normal at the most dissimilar surface normal of each segment is substantially minimized. Additionally, or alternatively, the cross-section may be segmented such that the angle between the most dissimilar surface normal of each segment are substantially the same.

In various embodiments, the system may also account for geometries across multiple cross-sections when generating segments. Thus, where possible, a plurality of the portions to be measured are accounted for when generating segments. FIGS. 8D and 8E schematically show two different ways of assigning segments based on segmenting multiple cross-sections and/or features 19. A initial reference vector that is parallel between the various cross-sections may be chosen. Based on the number of segments, if provided, the initial reference vector may be used to determine the initial vector (e.g., if four segments are chosen, the initial reference vector may span surface normal that are within +−45 degrees of the reference vector).

In FIG. 8D, assume that the angle of incidence is 90 degrees, i.e., the probe 18 measure accurately within 90 degrees of the surface normal. For a given circular cross-section, any four segments equally separated can measure the circular cross section. However, if the system is aware that another surface to be measured has a particular orientation that provides a constraint on the ideal vector, then the system can reduce or minimize the number of unique wrist orientations used to measure the object. Illustrative embodiments minimize the total number of ideal vectors needed to measure all the features of interest.

For example, in FIG. 8D, the system measures a diamond cross-section in addition to a circular cross-section. The system determines that mutual ideal vectors can measure segments on the circular cross-section and the diamond cross-section. Thus, in the example of FIG. 8D, where the diamond and circle cross-sections are being measured, the process segments the circle as shown: segment AB, segment BC, segment CD, and segment DA. In the example of FIG. 8E, where the square and circle cross-sections are being measured, the system determines that mutual ideal vectors can be used to measure segments on the square cross-section and the circular cross-section. Thus, the process segments the circle as shown: segment EF, segment FG, segment GH, and segment HE. Accordingly, a particular cross-section may be segmented differently based on other cross-sections to be measured. In the examples of FIGS. 8D and 8E, the segments for the same cross-section are rotated 90 degrees). Of course, this is a simplified example, and those skilled in the art understand that a variety of different cross-sections may be used. Additionally, or alternatively, a plurality of different measurement features may be used (i.e., two or more).

The end points of each segment are determined based on characteristics of the geometry as a whole (e.g., based on geometry of the blade 19 cross-section and the criticality of specific portions of that cross-section). Furthermore, illustrative embodiments may include logic to specifically exclude segments from ending on a structurally significant portion of the feature 19. After the individual segments are established, each segment is considered individually and the surface point normals and XYZ location for the extreme criteria are analyzed. In the case of the optical probe 18, the normal vectors are analyzed, but the XYZ locations are not necessarily analyzed, so the ideal orientation is determined during measurement for each segment (this is later considered in aggregate of all segments for grouping). Other methods could take a similar approach depending on the method of measurement. Illustrative embodiments using a tactile probe may consider the XYZ values with equivalent weight as the angles, as the tactile probe may have access considerations. For example, on the CMM 10, the maximum and minimum height (relative to the granite base) are considerations when splitting segments for tactile probes 18. This information could be used to determine critical characteristics of the segments, in this case height, which could later be used to group the segments for measurement with a single hardware orientation.

As shown in FIG. 8B, the cross-section CSN of FIG. 8A is broken down into twelve segments (segment AB, segment BC, segment CD, segment DE, segment EF, segment FG, segment GH, segment HI, segment IJ, segment JK, segment KL, and segment LA). Each segment can be measured using a single fixed wrist 17 orientation for the given segment (e.g., because the surface angle does not change and is measurable by the probe 18 in the particular orientation of the wrist 17). Although the above segments are named based on their endpoints, it should be understood that in various embodiments the segment endpoints may be switched (e.g., segment AB may be referred to as segment BA, etc.).

The process then proceeds to step 710, which determines the ideal geometric characteristics required for measuring the various segments (e.g., the ideal orientation of the beam relative to the surface). These characteristics are later used to determine ideal position and orientation of the CMM 10 wrist 17. In various embodiments, the ideal vector may be the bisecting vector 52 that bisects the two most angular extreme vectors 50. The vectors may instruct the CMM 10 to maintain the wrist 17 in a particular orientation as the arm 20 moves while scanning the segment. Thus, the CMM 10 receives instructions to measurement each of the segments with a particular wrist 17 orientation. However, that exact orientation of the wrist 17 is not known until the hardware (e.g., probe 18 and wrist 17) being used is determined. The ideal vectors merely assign a fixed wrist 17 orientation to a particular segment.

As described above with reference to step 708, the segments may be determined by using the two most dissimilar vectors of any points within any of the segments within that group. Those most dissimilar vectors are the extreme vectors of the segment (not necessarily the endpoints of the segment). Illustrative embodiments then determine the bisecting vector 52 of the extreme vectors 50, which is the ideal measurement orientation vector (i.e., the ideal vector) for the segment (e.g., because the bisecting vector 52 is the ideal vector that can measure all portions of the segment while being within the given tolerance). In a similar manner, illustrative embodiments may be applied for height based critical characteristics for certain tactile measurement approaches.

The process then proceeds to step 712, which determines the hardware orientation that corresponds to the ideal vectors. Thus, after the ideal characteristic information for the group is determined, illustrative embodiments determine the corresponding hardware orientations that could be used to measure the group of segments while minimizing major contributions to measurement error (e.g., matching the wrist 17 orientation to the ideal vector of the group as best as possible given the hardware).

The process then proceeds to step 714, which efficiently measures the cross-section(s) CSN according to wrist 17 orientation. Thus, in the example of FIGS. 8A-8C, the 12 segments are grouped into four groups:

Group I: segment AB,
Group II: segment LA, segment IH, and segment ED;
Group III: segment JK, segment FG, and segment BC;
Group IV: segment JI, segment FE, segment LK, segment HG, and segment DC.

In FIG. 8C, the dashed lines represent the surface normal at the given point (e.g., at the endpoint).

In various embodiments, the CMM 10 measures the segments of a particular group before moving to a different group. Thus, assuming that group IV is the first to be measured, all of the segments in group IV are measured prior to moving to another group. Thus, the CMM 10 may take a measurement path that is as follows: measurement segment CD, skip segment DE, measure segment EF, skip segment FG, measure segment GH, skip segment HI, measure segment IJ, skip segment JK, measure segment KL. The CMM 10 may then measure each group one after the other. In various embodiments, after a given group is measured, the next closest segment that was not already measured may be measured next, along with all other segments in the same group as the next closest segment.

The inventors were surprised to find that even though segments that are nearest in proximity may be skipped and returned to, the overall time for the complete scan of the cross-section is reduced because of reduced time required for changing wrist orientations between measurements. The skipping of the section increases reliability and accuracy of the measurement. The increased reliability and accuracy allows the end user to skip programming additional wrist angles, which otherwise has a negative impact on throughput.

Although this process 700 is with reference to a single object 11 and feature 19, it should be understood that multiple objects 11 and/or features 19 may be used. Furthermore, multiple different object 11 types may be used (e.g., objects 11 having a rectangular shape and objects 11 having a circular shape). In some embodiments, the CMM 10 measures more than one object 11 on the base 13. For example, the base 13 may support two objects 11, three objects 11, a random arrangement of objects 11, or a two-dimensional array of objects 11. To that end, illustrative embodiments position the combined virtual object model and the virtual 3D movement model in the measurement space of the CMM 10.

Furthermore, although this process 700 has been described with an example of a single cross-section, it should be understood that this process may be extended to cover a plurality of cross-sections (e.g., that are part of the same feature 19 and/or different features 19). For example, some embodiments may measure all of the segments in a group across multiple cross-sections, the entirety of the feature, and/or the entirety of the measurement protocol. Some other embodiments may measure all the groups of a cross-section before proceeding to another cross-section.

It should be noted that the method shown in FIG. 7A is substantially simplified from a longer process that may normally be used. Accordingly, the method of FIG. 7A may have many other steps that those skilled in the art likely would use. In addition, some of the steps, or parts thereof, are optional (e.g., step 704) and/or may be performed in a different order than that shown (e.g., step 708 may begin before step 702), or at the same time. Those skilled in the art therefore can modify the process as appropriate.

Figure 7B:
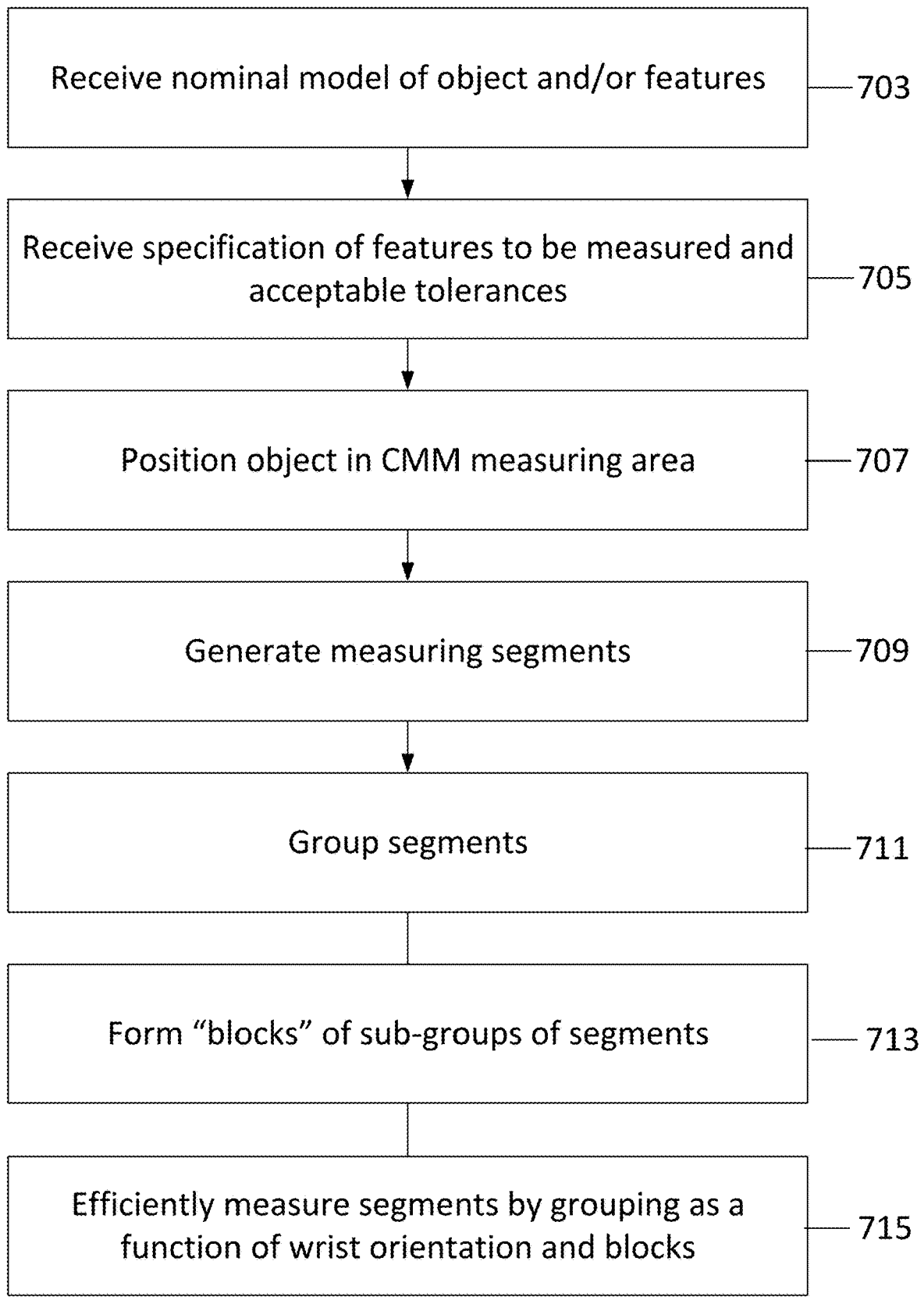
FIG. 7B shows a process of efficiently measuring the object in accordance with illustrative embodiments of the invention.

FIG. 7B shows a process of efficiently measuring the object 11 in accordance with illustrative embodiments of the invention. For the sake of ease of discussion, the process of FIG. 7B is described with reference to FIGS. 8F-8I. FIGS. 8F-8I schematically show four cross-sections from two features being segmented into measurement segments for measuring in accordance with illustrative embodiments.

The process begins at step 703, which receives a nominal model (e.g., CAD) of the object 11 and/or features 19 to be measured. For example, a CAD model of the blisk 11 having the blades 19 may be received. As shown in FIGS. 8F and 8G, a CAD model may be received for a part having a "E" shaped cross-sections CSA1 and CSA2, as well as a "n" shaped cross-sections CSB1 and CSB2.

The process then proceeds to step 705, which receives specifications of features to be measured and/or acceptable tolerances. For example, it may be desirable to measure the outer-perimeter of the cross-sections CSA1, CSA2, CSB1, and CSB2. There may also be a measurement tolerance within which the measurement must be performed that is provided at this time.

The process then proceeds to step 707, which positions the object 11 in the CMM measuring area 12 to be measured. When the object 11 is positioned in the measuring area 12, the CMM is able to register the relative orientation and position of the object 11 relative to the measuring area 12 and the model. Illustrative embodiments may use fixtures, fiducials or other known methods for the registration of the physical workpiece 11 within the CAD model. Discussion of this registration is beyond the scope of the present application and is well known in the art.

The process then proceeds to step 709, which generates measuring segments that can each be measured using a particular hardware orientation. The system analyzes the cross-section to determine what portions of the cross-section to be measured are measurable by similar hardware configurations and orientations (e.g., measurable by the optical probe beam being normal to the surface of the segment within the specified tolerance) at a particular wrist orientation. The process of segmentation is discussed elsewhere herein and in copending application 63/192,725 and is not again repeated here in its entirety.

In various embodiments, the system may analyze multiple cross-sections, multiple features of an object, and/or multiple objects when generating the measurement segments. Thus, the system may generate segments by minimizing the number of ideal vectors needed to measure all the features.

Figure 8H:
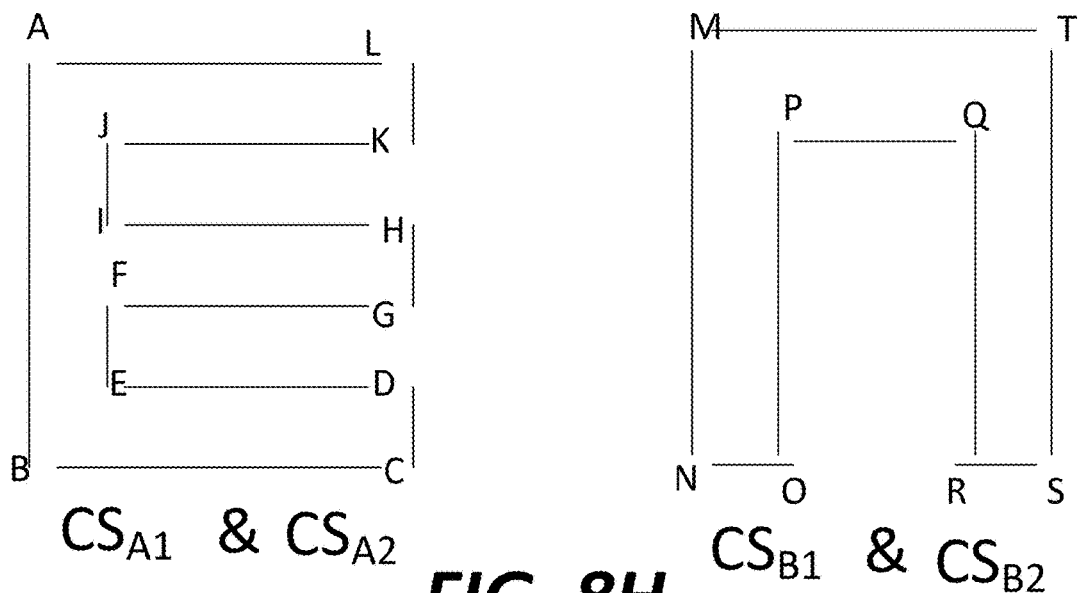

As shown in FIG. 8H, the cross-sections CSA1 and CSA2 of FIG. 8F are broken down into 12 segments for each cross-section (i.e., a total of 2 sets of 12 segments including: segment AB, segment BC, segment CD, segment DE, segment EF, segment FG, segment GH, segment HI, segment IJ, segment JK, segment KL, and segment LA).

In a similar manner, the cross-sections of CSB1 and CSB2 of FIG. 8G are broken down into 8 segments for each cross-section (i.e., a total of 2 sets of 8 segments including: segment MN, segment NO, segment OP, segment PQ, segment QR, segment RS, segment ST, and segment TM).

Each of the segments can be measured using a single fixed wrist orientation (e.g., because the surface angle does not change and is measurable by the probe 18 in the particular orientation of the wrist 17).

Figure 8I:
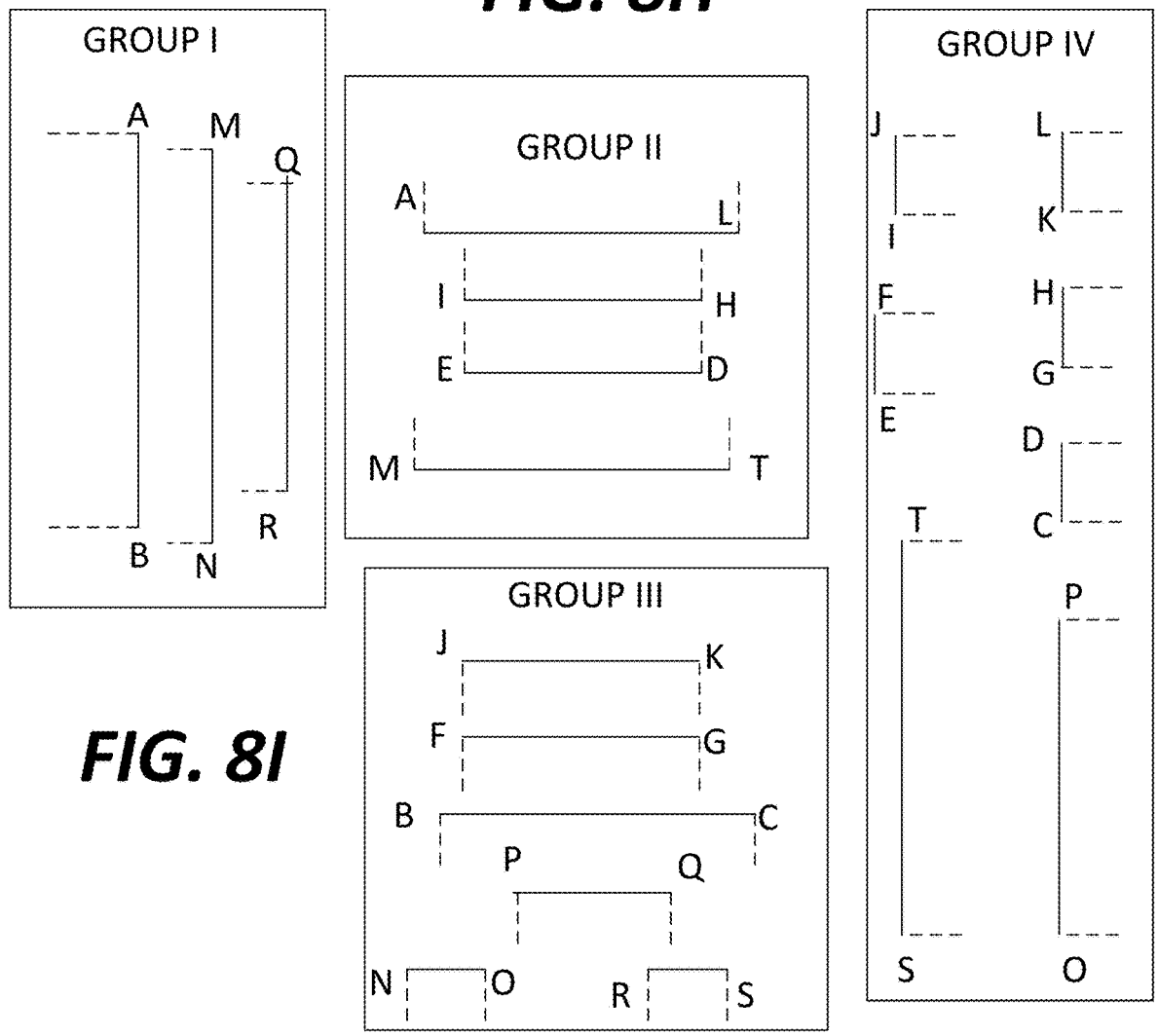

The process then proceeds to step 711, which assigns segments to groups. FIG. 8I schematically shows the various segments of FIG. 8H assigned to groups. For the sake of convenience, repetitive segments (such as segment AB from CSA1 and CSA2) are shown only for group I, but both identical segments are grouped together in illustrative embodiments. In this example, the segments are broken up into four different groups based on the ideal vector that can be used to measure the segments, as described below:

Group I: segmentAB of $CS_{A1}$, segment AB of $CS_{A2}$, segment MN of $CS_{B1}$, segmentMN of $CS_{B2}$, segmentQR of $CS_{B1}$, segmentQR of $CS_{B2}$.

Group II: segment LA, segment IH, segment ED, and segment MT;

Group III: segment JK, segment FG, segment BC, segment PQ, segment NO, and segment RS;

Group IV: segment JI, segment FE, segment LK, segment HG, segment DC, segment TS, and segment PO.

The segments of Group I: segmentsAB, segmentsMN, and segmentsQR are measured prior to moving to a different group. Within the group, the segments may be measured in any desired order, but in general, illustrative embodiments may use a proximity module to measure segments in the same group that are closest together. Thus, for example, the measurement order may be as follows: (1) segmentAB of $CS_{A1}$, (2) segmentAB of $CS_{A2}$,
(3) segmentMN of $CS_{B2}$,
(4) segment MN of $CS_{B1}$,
(5) segment QR of $CS_{B1}$, and
(6) segment QR of $CS_{B2}$.

The above described order for measurement is one of many examples. Those of skill in the art can conceive of various ways to measure the various segments within a particular grouping while maintaining within the scope of illustrative embodiments of the invention, including but not limited to: proximity, ease of accessibility of the probe to the measuring segment, and/or similarity of hardware orientations, for example minimizing wrist or rotary table angle changes as we cycle through the groups.

Thus, in some embodiments, all of the segments of a particular group are measured prior to changing hardware orientation and measuring segments of the second group.

In some embodiments, however, a group may be divided into a sub-group known as a block. In some cases, only the entirety of the block may be measured prior to changing hardware orientation and measuring segments of a different group.

Accordingly, the process proceeds to step 713, which forms "blocks" from a group divided into sub-groups. By segmenting and grouping segments to reduce measurement speed, the inventor uncovered that a new problem was created. Specifically, by measuring all of the segments of a group (e.g., which may span from parts of blade 19A to 19N), the time between complete measurement of a feature 19 is no longer inconsequential. This is opposed to prior art methods, which measure feature by feature (e.g., blade by blade), wherein the time between complete measurement of features is small. For metrology applications, even small changes in temperature or other time-based environment or systems can cause detectable differences in measurements.

Therefore, when measuring using the group measurement process described above, it is possible that a considerable amount of time passes prior to a measurement of the entire feature 19 being completed. The inventor discovered that this problem could be alleviated by measuring each group up to a particular block size. Details of determining blocks are discussed with reference to FIG. 7C below.

The process proceeds to step 715, which efficiently measures segments by group as a function of a wrist orientation and block size. Assuming there is no block limitation, when the CMM 10 measures the cross-section CSA, each group is measured before moving to a different group. Thus, assuming that group IV is the first to be measured, all of the segments in group IV are measured prior to moving to another group. Thus, the CMM may take a measurement path that is as follows for GroupIV: (1) for $CS_{A1}$ & $CS_{A2}$: measure segment CD, skip segment DE, measure segment EF, skip segment FG, measure segment GH, skip segment HI, measure segment IJ, skip segment JK, measure segment KL; (2) for $CS_{B1}$ & $CS_{B2}$: measure segment OP, skip segment PQ, skip segment QR, skip segment RS, measure segment ST. The CMM 10 may then measure each group one after the other.

The inventors were surprised to find that even though segments that are nearest in proximity may be skipped and returned to, the overall time for the complete scan of the cross-section is reduced because of reduced time required for changing wrist orientations between measurements. It was found that the time cost of the motion was inconsequential compared to the time cost of changing the hardware orientation.

Although this process is with reference to a single object 11 and feature 19, it should be understood that multiple objects 11 and/or features 19 may be used. Furthermore, multiple different object 11 types may be used (e.g., objects 11 having a rectangular shape and objects 11 having a circular shape). In some embodiments, the CMM 10 measures more than one object 11 on the base 13. For example, the base 13 may support two objects 11, three objects 11, a random arrangement of objects 11, or a two-dimensional array of objects 11. To that end, illustrative embodiments position the combined virtual object model and the virtual 3D movement model in the measurement space of the CMM 10.

The process then comes to an end.

Figure 7C:
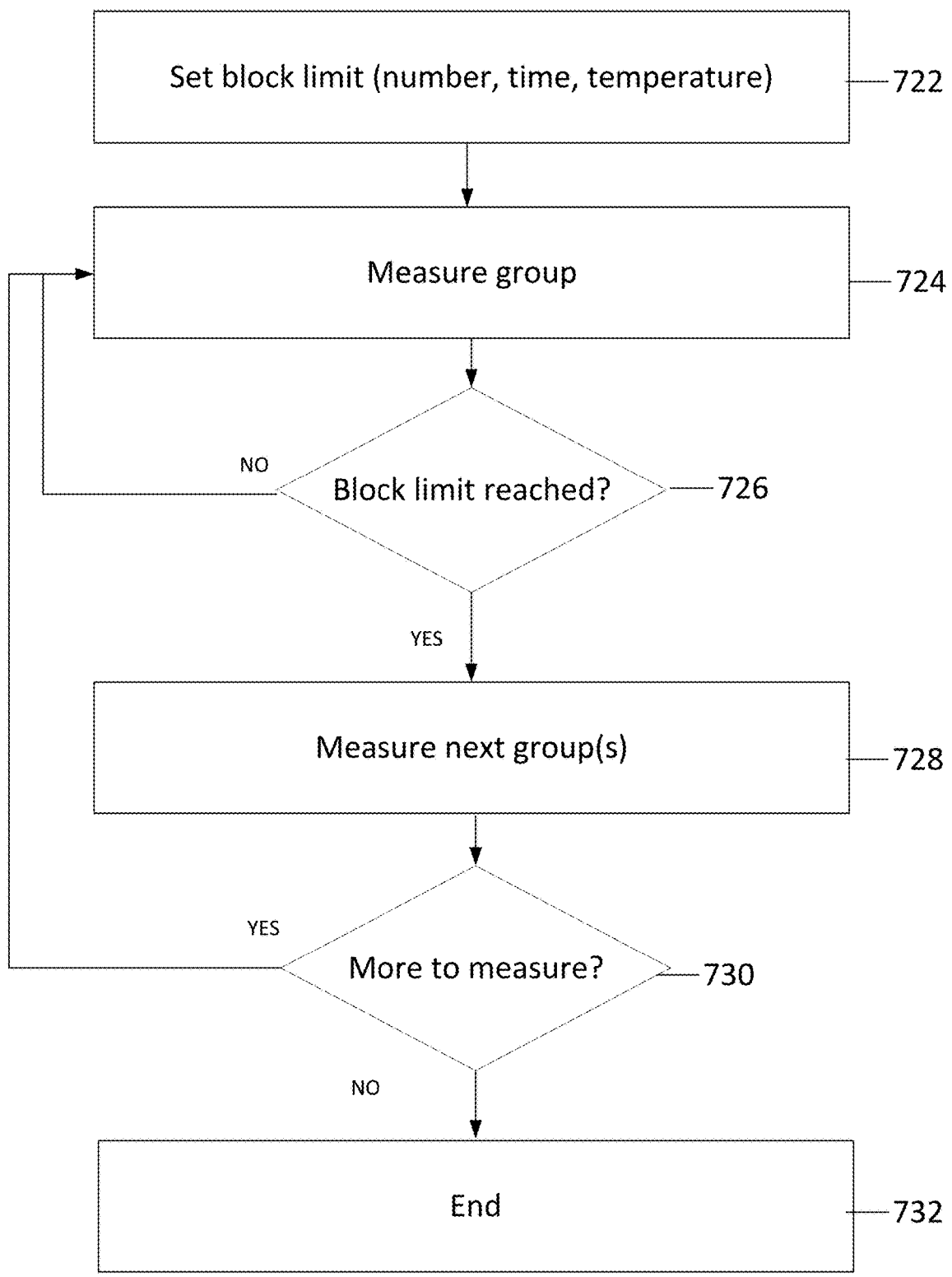
FIG. 7C shows a detailed process of forming blocks of sub-groups of segments.

FIG. 7C shows a detailed process of forming blocks of sub-groups of segments 713. The process of forming blocks begins at step 722, where the block limit is set. In illustrative embodiments, the block limit may be set by a user or automatically by the system. The block limit may be a specific number, such as a set number of segments, cross-sections or features 19 (e.g., blades 19). Additionally, or alternatively, the block limit may be a pre-set time (e.g., limit the block to whatever segments can be measured in 15 minutes). Furthermore, in some embodiments, the block limit may be set as a function of temperature (e.g., of the part or of ambient). Illustrative embodiments may also tie this to temperature change of specific components of the system. For example, the block limit may be set by the temperature of a bridge (e.g., for a CMM with an aluminum bridge) rather than that of the granite. Some embodiments have different thermal gradient thresholds for the granite and the aluminum, but may react to either. Accordingly, by limiting the block size, measurements of entire cross-sections and/or features can be performed rapidly while accounting for environmental factors that may impact measurement quality. That is, the entirety of one or more groups may not be measured at once, as limited by the block limit.

The process then proceeds to step 724, which begins to measure the group as described previously. Accordingly, the CMM 10 may begin measuring all of the segments of a particular group.

The process then proceeds to step 726, which asks if the block limit has been reached. If the block limit has not been reached, the process continues measuring the group. However, if the block limit has been reached, then the process stops measuring that group and proceeds to step 728, which measures the next group (or groups) that correspond to the previously measured group block (e.g., measure corresponding features 19 or segments as previous block). Thus, if the block size is 3 blades, and all of blades 19A, 19B, and 19C were measured for Group A, the block limit is reached, and the next group (e.g., Group B) is measured for those same corresponding features (e.g., blades 19A, 19B, and 19C). When the block limit is reached for Group B, step 728 proceeds to measure Group C up to the block limit and so forth (assuming there are more groups to measure). Thus, various embodiments may incompletely measure a given group based on a block limit.

The process proceeds to 730 which asks if there is more to measure. If yes, the process continues measuring. For example, the process may return to measure Group A of blades 19D, 19E, and 19F, before reaching the block limit again. The process may be repeated for all of the features to be measured and for all of the segment groups. If measurement is complete, then the process comes to an end at step 732.

It should be noted that the methods shown in FIGS. 7B-7C are substantially simplified from a longer process that may normally be used. Accordingly, the methods of FIG. 7B-7C may have many other steps that those skilled in the art likely would use. In addition, some of the steps, or parts thereof, are optional (e.g., step 705) and/or may be performed in a different order than that shown (e.g., step 709 may begin before step 703), or at the same time. Those skilled in the art therefore can modify the process as appropriate.

Figure 9:
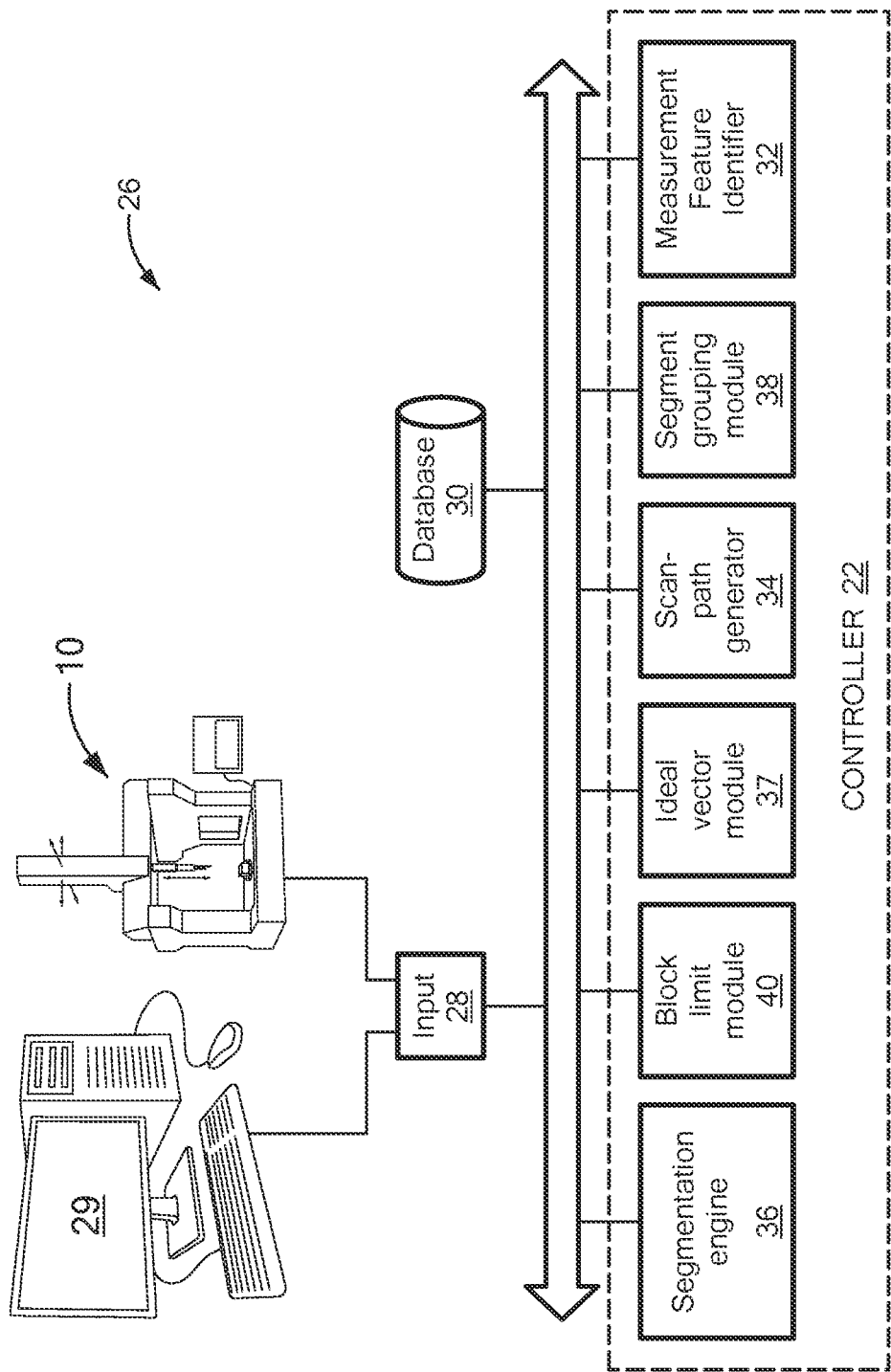
FIG. 9 shows details of an object measuring system in accordance with illustrative embodiments of the invention.

FIG. 9 shows details of an object measuring system 26 in accordance with illustrative embodiments of the invention. FIG. 9 contains many modules and components described in application 63/192,725. For example, in some embodiments, the measuring system controller 22 provides instructions, either to a human operator or to a robot, to arrange objects 11 in the measurement space 12 of the CMM 10 in a prescribed position and orientation. Preferably, the measuring system controller 22 provides instructions to arrange the objects 11 such that the CMM 10 can measure the objects 11 without interference from the objects 11 and/or the fixtures that support the objects 11.

To that end, the measuring system controller 22 includes an input 28 configured to receive a three-dimensional model of one or more objects 11 to be measured (e.g., from a user on a computer and/or the CMM 10). For example, the model of the object 11 may be a CAD model. In some embodiments, the model includes a fixture configured to hold the object 11 (e.g., couple the object 11 to a fixture plate). However, in some other embodiments, the object 11 model may not include the fixture. Generally, the object 11 being measured is manufactured (e.g., injection molded) on the basis of some underlying three-dimensional model with nominal object 11 specifications—i.e., the object 11 model. The object 11 model generally includes the ideal specifications of the object 11, including measurements for various dimensions. In various embodiments, the object 11 is measured by the CMM 10 to compare the physical dimensions of the object 11 with the nominal dimensions in the model.

The measuring system controller 22 also communicates with a database 30, where the various received models for different types of objects 11 may be stored. Additionally, the database 30 may include information about the object 11 such as structurally significant points where segments should not end. The database 30 may also include information relating to the CMM 10. For example, the database 30 may include information about the make and model of the CMM 10, in addition to information regarding the movable components 16. As an additional example, the database 30 may have information relating to the size and dimensions of the various movable components 16 (e.g., make and model of probe 18 and wrist 17 with associated dimensions). Furthermore, the database 30 may include information (e.g., a CAD model) relating to the fixture that corresponds to each particular object 11. Alternatively, the above described information may be received through the input 28. The input 28 also receives information relating to acceptable tolerances for measurements of various objects (which may be user-inputted or included as part of the model).

A measurement feature identifier 32 communicates with the database 30 and/or the input 28 and determines what features of the object 11 to measure. The measurement feature identifier 32 may be pre-programmed to select certain features to measure based on the identification of a particular type of object 11. For example, for a particular rectangular part, the measurement feature identifier 32 may determine that two edges should be measured. Alternatively, the feature to be measured may be selected by the user through the input 28. The measurement feature identifier 32 communicates with a segmentation engine 36 and informs the segmentation engine regarding the one or more features 19 to be measured. For example, the measurement feature identifier 32 may specify that cross-sections CS1-CSN, or portions of the cross-sections, should be measured on a particular feature.

The segmentation engine 36 analyzes the particular cross-sections to be measured CS1-CSN and determines ideal vectors that are used to segment the cross-section(s). In various embodiments, the segmentation engine 36 determines one or more ideal vectors that reduce the number of unique ideal vectors needed to perform the measurement, and thus, the number of wrist 17 orientation adjustments, as described previously. To that end, the segmentation engine 36 has access to the CAD file to analyze the various portions of the surface to be measured, and furthermore may have access to information relating to the object 11, the CMM 10, probe 18, and/or wrist 17, to determine what portions of the surface can be scanned within a certain tolerance (e.g., certain hardware thresholds, such as angle of incidence with an optical probe) by the given combination of the CMM 10, probe 18, and/or wrist 17.

In illustrative embodiments, the segmentation engine 36 segments profiles (e.g., cross-sections) based on known and expected geometric characteristics of the actual workpiece as well as structurally significant portions of the cross-section function when in use (e.g., the ability of a blade to work with the engine to create large pressure differentials when the engine rotates). For example, in the case of blades, the segmentation engine is provided with information that the edges (e.g., the leading edge 42 and the trailing edge 48) are the most significant measurements, but also that the entire cross-section needs to be inspected and free of major defects. The segmentation engine 36 thus receives information that the edges are significant, but that no part of the cross-section is insignificant. The segmentation engine 36 may thus account for particularly significant features 19. Some embodiments may increase the number of ideal vectors used to accurately measure a significant measurement portion relative to other portions of the feature 19.

The segmentation engine 36 uses this information to split the cross-section into segments that are equal (i.e., equality is driven by normal surface vector angular difference as described previously, not by scan path length). This equality is important because failure of the measurement system is unacceptable at any point of measurement, regardless of where it is within the cross-section. In illustrative embodiments, the segmentation engine 36 may have instructions to avoid splitting the segments on the structurally significant parts of the measurement (e.g., lead edge of a blade, contact surfaces for involute gears, points of contact for screw gears, globoid cam contact surfaces or break edges in transitional radii).

For example, the segmentation engine 36 is provided with information indicating that the edge profiles in traditional blade geometries can never face exactly in the same direction (e.g., this would be a half circle and not a blade). Furthermore, the segmentation engine 36 may be provided with information about the feature 19 of interest such as that the max thickness vector of a blade 19 is the only surface vector of the blade 19 that is colinear with a surface vector on the opposing side of the blade 19. The segmentation engine 36 can use the max thickness vector of the blade 19 profile (a mathematical calculation) as a starting point for any segmentation. The segmentation engine 36 may further ask a user (e.g., through graphical user interface 29) for a number of desired segments they wish for (e.g., 4, 5, 6, or greater). Alternatively, the segmentation engine 36 can automatically determine the number of segments. Illustrative embodiments then determine the angle of dispersion for each segment (e.g., 360 degrees divided by the number of segments). From the max thickness vector, all points with surface normals that are angularly separated by less than half of the angle of dispersion are included. These points may be the first segment for that cross-section. The second segment may perform this calculation from the max thickness vector rotated by the dispersion angle, either clockwise or counter clock wise, and so forth for each additional segment.

This results in all points being included in the segment. For compressor blades segmented into 6 segments, the end and start points generally do not lie on a critical point. Other blade like applications can be segmented in a similar manner, but blades with higher camber may require a different default number of segments, for example perhaps highly cambered turbine blades would require 8 segments to avoid splitting at the critical points of one of the edges.

Accordingly, the segmentation engine 36 logically sorts points of a cross-section of a feature into segments that are measurable by similar hardware parameters (e.g., wrist 17 angle) throughout the feature while not separating points coincident with the most critical portions of the cross-section and not exposing any one points or group of points to greater risk of measurement failure.

Figure 10A:
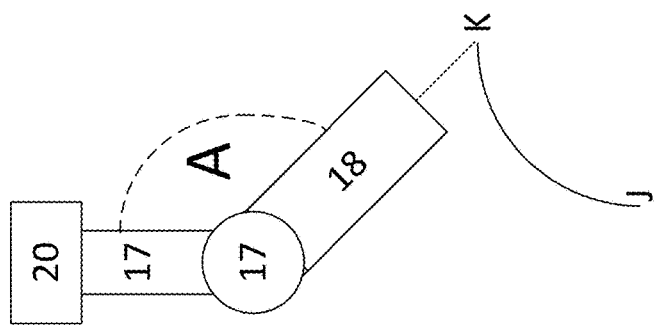
FIG. 10A schematically shows determining a bisecting vector based on extreme vectors of a segment in accordance with illustrative embodiments of the invention.

FIG. 10A schematically shows determining a bisecting vector 52 based on extreme vectors 50 of a segment in accordance with illustrative embodiments of the invention. The segmentation engine 36 may communicate with an ideal vector module 37. The ideal vector module 37 determines the ideal vector with which to measure the segment. As described previously, the ideal vector provides the ideal hardware orientation that allows the probe 18 to measure a segment along a particular beam path (or tactile probe path) without changing wrist 17 orientation. In FIG. 10A the segment to be measured is segment JK. As shown, the ideal vector module 37 determines the extreme vectors of the segment. The extreme vectors are defined by the surface normals that have the largest angular difference between them. The ideal vector module 37 may then bisect the extreme vectors 50 such that an angle phi is formed with the first extreme vector 50 and an angle theta with the second extreme vector 50, where phi and theta are identical or substantially identical.

Figure 10B:
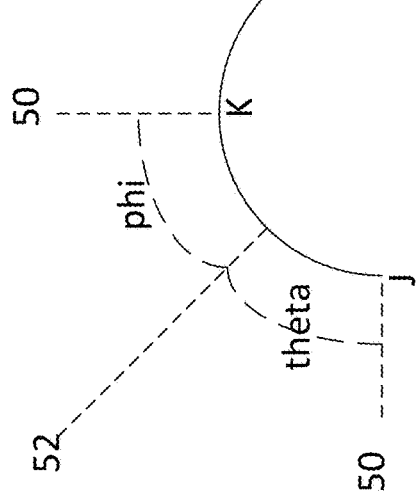
FIG. 10B schematically shows a process of measuring the segment of FIG. 10A in accordance with illustrative embodiments of the invention.
Figure 10B:
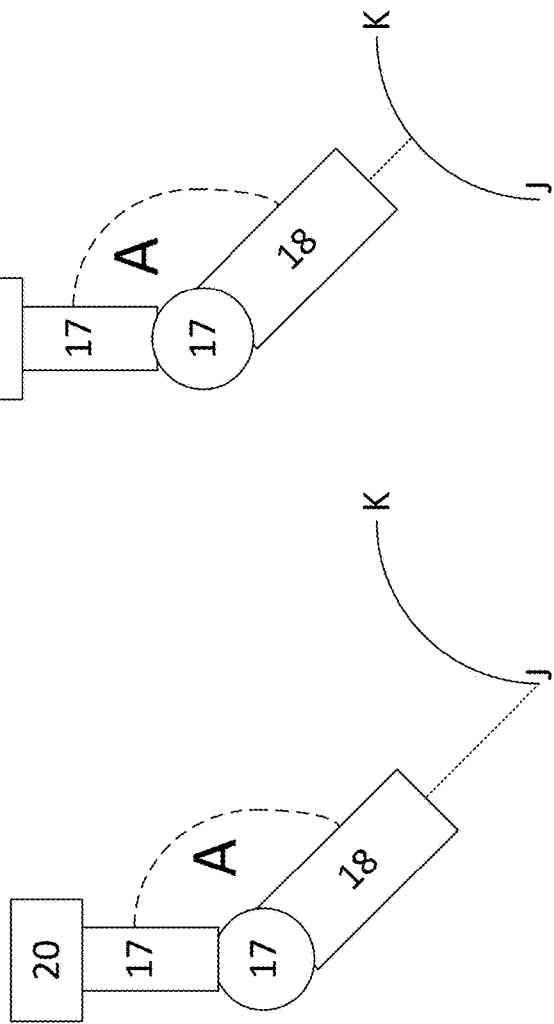

FIG. 10B schematically shows a process of measuring the segment of FIG. 10A in accordance with illustrative embodiments of the invention. As shown, the beam approaches the segment at the appropriate orientation relative to the bisecting vector (also referred to as the ideal vector along which the hardware provides the probe orientation (e.g., beam orientation) that can measure the segment within tolerance). In general, optical probes are oriented parallel to the bisecting vector whereas tactile probe orient their stem approximately normal to the bisecting vector (as allowable by accessibility). As the segment is measured the probe maintains the same orientation through the measurement of the entire segment. Furthermore, to maintain this orientation, the orientation of the wrist 17 does not change during measurement of the segment. For example, the angles A and B from FIG. 6A remain the same during the entire measurement of the segment.

Figures 10C, 10D:
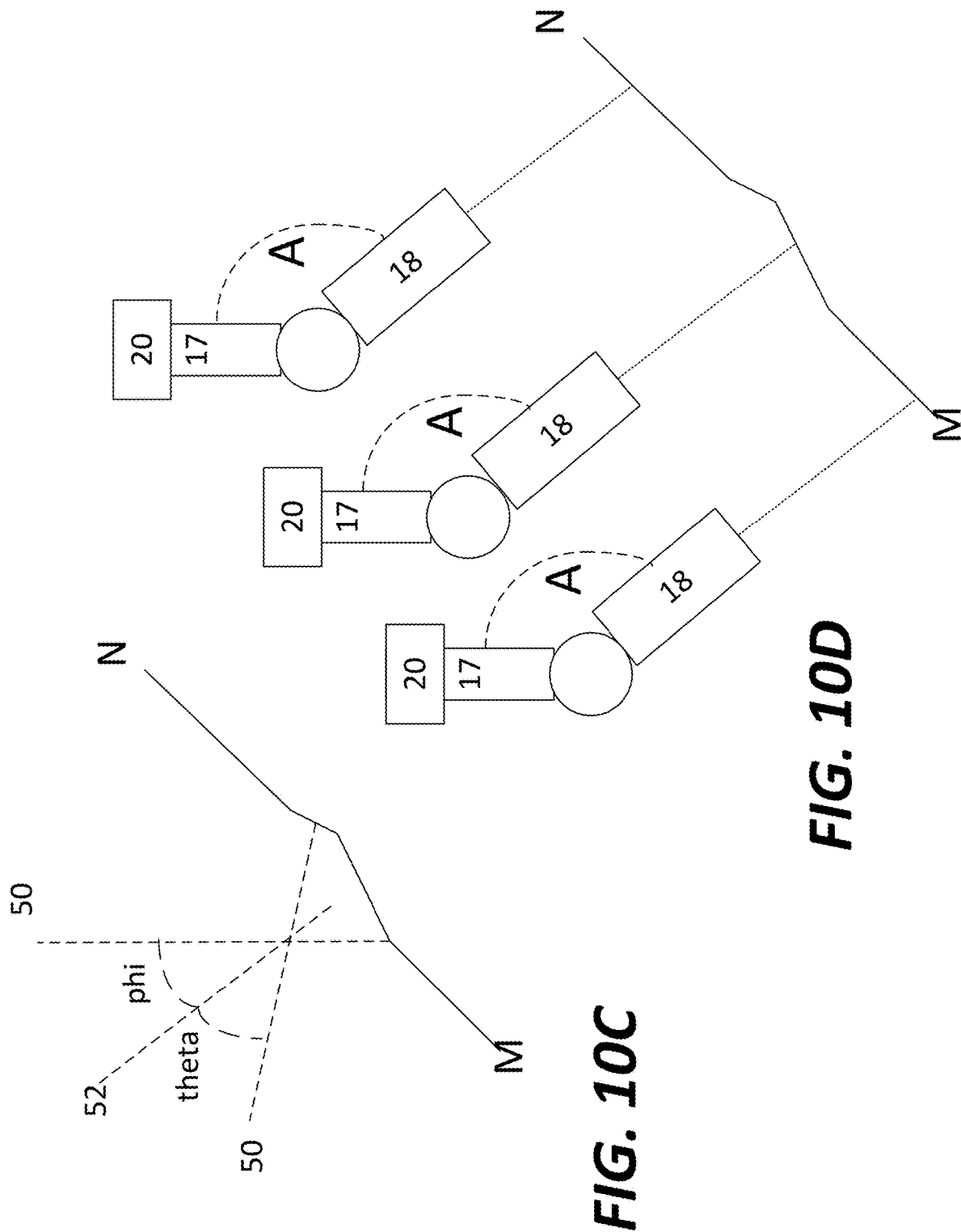
FIG. 10C schematically shows determining a bisecting vector based on extreme vectors of a segment in accordance with illustrative embodiments of the invention.
FIG. 10D schematically shows a process of measuring the segment of FIG. 10C in accordance with illustrative embodiments of the invention.

FIG. 10C schematically shows another example of determining a bisecting vector based on extreme vectors 50 of a segment NM in accordance with illustrative embodiments of the invention.

FIG. 10D schematically shows a process of measuring the segment MN of FIG. 10C in accordance with illustrative embodiments of the invention. Even when the arm 20 moves the position of the wrist 17 in X, Y, and Z, the angles (e.g., A and B) of the wrist 17 are not changed during measurement of the segment. The position of the probe 18 does move in space as the segment is measured, but for a given segment, the probe 18 is fixed relative to the wrist 17.

As discussed previously, the segmentation engine 36 segments, among other things, profiles. These profiles may include, among other things, a 2D cross-section of a 3D feature, 2D curve(s) projected onto a 3D feature, or 3D Grid(s) projected on a 3D feature. In some simplistic instances the profile could be represented by point(s), including a single point projected onto a 3D feature. Any of these examples would have the specific intent of providing data regarding the position, orientation form and/or profile of an important characteristic of the part in question.

The segmentation engine 36 communicates with the scan path generator 34, and informs it regarding the one or more segments to be measured. After the segments are determined, the scan path generator 34 groups the segments into groups based on which segments may be measured using the same wrist orientation. The scan path generator 34 then generates a scan path to measure that feature 19 going from group to group. The scan path generator 34 may generate vectors that include an orientation of the wrist 17 and a movement path for the given wrist 17 orientation. Accordingly, the scan path generator 34 may create part programs "on the fly" for respective objects 11 and/or features 19. This is in contrast to prior art methods that require a pre-set part program that instructs the CMM 10 as to how to measure.

Illustrative embodiments allow linking of multiple segment measurements in a single continuous scan using non-continuous wrists 17 and/or continuous wrists 17. This flexibility results in optimized throughput, even when features are skipped, and provides the end user with flexibility to select what features they do or do not measure. In contrast, prior art methods skip features by instructions CMMs to measure each segment discretely (e.g., based on proximity—not based on ideal vector+tolerance).

Advantageously, illustrative embodiments allow a user to skip a cross-section (e.g., CS3) in the middle of the blade without measuring the entire surface. In contrast, many prior art methods measure the entirety of the surface or portions between measurement sections, meaning skipping offers no time savings. Illustrative embodiments enable safe manufacturing sampling plans which generally should have controlled patterns of measurement of many features while skipping some of the sub-features (e.g., cross-sections) in a controlled manner where every N parts the sub-feature of interest is still being inspected.

FIG. 9 also shows a segment grouping module 38. The segment grouping module 38 receives the various segments generated by the segmentation engine 36 and determines what segments can be grouped together (e.g., measured using the same ideal vector). The segment grouping module 38 groups these segments together.

The segment grouping module 38 communicates with a block limit module 40. The block limit module 40 sets a limit to the block size of the group as described with reference to FIG. 7C. The block limit module 40 and the segment grouping module 38 communicate with the scan-path generator 34 to generate a scan-path in accordance with the constraints set by the two modules 38 and 40. In various embodiments, the block limit module 40 communicates with the input 28 to receive a block limit from a user. Alternatively, the block limit module 40 may receive a block limit from the database 30.

Each of the above-described components is operatively connected by any conventional interconnect mechanism. FIG. 9 simply shows a bus communicating each of the components. Those skilled in the art should understand that this generalized representation can be modified to include other conventional direct or indirect connections. Accordingly, discussion of a bus is not intended to limit various embodiments.

Indeed, it should be noted that FIG. 9 only schematically shows each of these components. Those skilled in the art should understand that each of these components can be implemented in a variety of conventional manners, such as by using hardware, software, or a combination of hardware and software, across one or more other functional components. For example, the scan path generator 34 may be implemented using a plurality of microprocessors executing firmware. As another example, the segmentation engine 36 may be implemented using one or more application specific integrated circuits (i.e., "ASICs") and related software, or a combination of ASICs, discrete electronic components (e.g., transistors), and microprocessors. Accordingly, the representation of the segmentation engine 36 and other components in a single box of FIG. 9 is for simplicity purposes only.

In fact, in some embodiments, the segmentation engine 36 of FIG. 9 is distributed across a plurality of different machines—not necessarily within the same housing or chassis. Additionally, in some embodiments, components shown as separate (such as the block limit module 40 and the segment grouping module 38) may be replaced by a single component. Furthermore, certain components and sub-components in FIG. 9 are optional. For example, some embodiments may not use the measurement feature identifier 32.

It should be reiterated that the representation of FIG. 9 is a significantly simplified representation of an object measuring system 26. Those skilled in the art should understand that such a system may have other physical and functional components, such as central processing units, other packet processing modules, and short-term memory. Accordingly, this discussion is not intended to suggest that FIG. 9 represents all of the elements of an object measuring system 26.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as pre-programmed hardware elements (e.g., application specific integrated circuits, FPGAs, programmable analog circuitry, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein.

It is, therefore, to be understood that the foregoing embodiments are presented by way of example only and that, within the scope of the appended claims and equivalents thereto, inventive embodiments may be practiced otherwise than as specifically described and claimed. Illustrative embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Disclosed embodiments, or portions thereof, may be combined in ways not listed above and/or not explicitly claimed. Thus, one or more features from variously disclosed examples and embodiments may be combined in various ways.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the above discussion discloses various exemplary embodiments of the invention, it should be apparent that those skilled in the art can make various modifications that will achieve some of the advantages of the invention without departing from the true scope of the invention.

What is claimed is:

1. A method of efficiently measuring an object having a feature, the feature having a plurality of profiles each having a surface, the method comprising:
providing a coordinate measuring machine having a wrist coupled with a measuring probe, the probe having a tolerance angle with respect to a surface normal of a surface to be measured, the wrist having a first given orientation that is adjustable to a second given orientation;

segmenting an object to be measured into a plurality of segments as a function of a wrist orientation that can be used to measure a given segment within the tolerance;

determining a first group of segments that can be measured within the probe tolerance using a first ideal vector; and determining a second group of segments that can be measured within the probe tolerance using a second ideal vector.

2. The method as defined by claim 1, further comprising:

measuring the segments of the first group of segments; and after measuring the segments of the first group of segments, measuring the segments of the second group of segments.

3. The method as defined by claim 2, wherein the segments of the first group are on a plurality of different cross-sections of a feature.

4. The method as defined by claim 2, wherein the segments of the first group are on a plurality of different features of an object.

5. The method as defined by claim 3, wherein the feature is a blade.

6. The method as defined by claim 4, wherein the object is a blisk.

7. The method as defined by claim 2, further comprising:

skipping measurement segments from the second group to measure segments from the first group.

8. The method as defined by claim 7, wherein skipping measurement segments comprises skipping segments that are closer in proximity to measure segments in a given group.

9. The method as defined by claim 1, wherein the plurality of segments are part of the same cross-section on the feature.

10. The method as defined by claim 1, further comprising determining a hardware orientation that corresponds to the ideal vector for each segment, the hardware including a wrist and a probe.

11. The method as defined by claim 1, wherein the wrist is a non-continuous wrist.

12. The method as defined by claim 1, further comprising:

selecting a first sub-group from the first group of segments to define a first block;

selecting a second sub-group from the first group of segments to define a second block;

selecting a third sub-group from the second group of segments to define a third block;

completing measurement of the first block prior to measurement of the second block; and completing measurement of the third block prior to measurement of the second block.

13. The method as defined by claim 12, wherein the first block is selected to minimize environmental errors caused by thermal expansion.

14. A method of efficiently measuring an object having a feature, the feature having a plurality of profiles each having a surface, the method comprising:

providing a coordinate measuring machine having an interface coupled with a measuring probe, the probe having a tolerance angle with respect to a surface normal of a surface to be measured, the interface having a given measurement orientation;

segmenting an object to be measured into a plurality of segments as a function of an ideal vector that can be used to measure a given segment within the tolerance;

determining a first group of segments that can be measured within the probe tolerance for a first ideal vector.

15. The method as defined by claim 14, further comprising determining a second group of segments that can be measured within the probe tolerance for a second ideal vector; and changing the interface to a second given measurement orientation that positions the probe to measure the second ideal vector within the probe tolerance.

16. A computer program product for use on a computer system for measuring an object, the computer program product comprising a tangible, non-transient computer usable medium having computer readable program code thereon, the computer readable program code comprising:

program code for providing a coordinate measuring machine having a wrist coupled with a measuring probe, the probe having a tolerance angle with respect to a surface normal of a surface to be measured, the wrist having a first given orientation that is adjustable to a second given orientation;

program code for segmenting an object to be measured into a plurality of segments as a function of a wrist orientation that can be used to measure a given segment within the tolerance;

program code for determining a first group of segments that can be measured within the probe tolerance using a first ideal vector; and program code for determining a second group of segments that can be measured within the probe tolerance using a second ideal vector.

17. The computer program product as defined by claim 16, further comprising:

program code for defining a first block by selecting a first sub-group from the first group of segments;

program code for defining a second block by selecting a second sub-group from the first group of segments;

program code for defining a third block by selecting a third sub-group from the second group of segments;

program code for measuring the first block prior to measurement of the second block; and program code for measuring the third block prior to measurement of the second block.

18. The computer program product as defined by claim 16, further comprising:

program code for skipping measurement segments from the second group to measure segments from the first group.

19. The computer program product as defined by claim 18, wherein skipping measurement segments comprises skipping segments that are closer in proximity to measure segments in a given group.

20. The computer program product as defined by claim 16, further comprising:

program code for setting a block limit.

* * * * *